United States Patent [19]

Nishikawa et al.

[11] Patent Number: 5,537,485
[45] Date of Patent: Jul. 16, 1996

[54] METHOD FOR COMPUTER-AIDED DETECTION OF CLUSTERED MICROCALCIFICATIONS FROM DIGITAL MAMMOGRAMS

[75] Inventors: Robert M. Nishikawa, Chicago; Maryellen L. Giger, Elmhurst; Kunio Doi, Willowbrook, all of Ill.

[73] Assignee: Arch Development Corporation, Chicago, Ill.

[21] Appl. No.: 915,631

[22] Filed: Jul. 21, 1992

[51] Int. Cl.⁶ .................................................. G06K 9/00
[52] U.S. Cl. .................... 382/130; 382/132; 382/257
[58] Field of Search ...................... 364/413.13, 413.22; 382/6, 19, 130, 132, 133, 128, 170, 172, 169, 257; 128/664

[56] References Cited

U.S. PATENT DOCUMENTS

| | | | |
|---|---|---|---|
| 4,665,554 | 5/1987 | Sternberg | 382/257 |
| 4,851,984 | 7/1989 | Doi et al. | 364/413.23 |
| 4,866,785 | 9/1989 | Shibano | 382/257 |
| 4,907,156 | 3/1990 | Doi et al. | 364/413.13 |
| 5,079,698 | 1/1992 | Grenier et al. | 364/413.13 |
| 5,268,967 | 12/1993 | Jang et al. | 382/132 |

OTHER PUBLICATIONS

William G. Wee et al., Evaluation of Mammographic Calcifications Using a Computer Program, Radiology 116: pp. 717–720, Sep. 1975, Work in Progress.

Heang–Ping Chan et al., Computer–Aided Detection of Microcalcifications in Mammograms Methodology and Preliminary Clinical Study, Investigative Radiology, Sep. 1988, vol. 23, No. 9, pp. 664–671, U.S.A.

Heang–Ping Chan et al., Improvement in Radiologists' Detection of Clustered Mecrocalcifications on Mammograms the Potential of Computer–Aided Diagnosis, Investigative Radiology, vol. 25, No. 10, Oct. 1990, pp. 1102–1110, U.S.A.

Maryellen L. Giger et al., Development of a "Smart" Workstation for Use in Mammography, SPIE, vol. 1445 Image processing (1991), pp. 101–103.

1991 AAPM Annual Meeting Program, pp. 598–599, Medical Physics, vol. 18, No. 3, May/Jun. 1991.

1990 AAPM Meeting Program, Diagnostic: Digital Radiography and 3D Imaging (Room 130), Medical Physics, vol. 17, No. 3, May/Jun. 1990, p. 524.

Robert M. Nishikawa et al., Computer–Aided Detection of Clustered Microcalcifications on Digital Mammograms (submitted to Medical & Biological Engineering & Computing).

Bahaa W. et al., Algorithm for the Detection of Fine Clustered Calcifications on Film Mammograms[1], pp. 333–337, Radiology.

Wolfgang Spiesberger, Mammogram Inspection by Computer, IEEE Transactions on Biomedical Engineering, vol. BME–26 No. 4, Apr. 1979, pp. 213–219.

D. H. Davies et al., Automatic Computer Detection of Clustered Calcifications in Digital Mammograms, Phys. Med. Biol. 1990, vol. 35, No. 8, pp. 1111–1118, UK.

Stanley II, Fox, et al., A Computer Analysis of Mammographic Microcalcifications: Global Approach, Dept. of Radiology, Univ. of Cincinnati College of Medicine, pp. 624–631.

Robert P. Loce et al., Facilitation of Optimal Binary Morphological Filter Design Via Structing Element Libraries and Design Constraints, Optical Engineering, May 1992, vol. 31, No. 5, pp. 1008–1025.

Gary T. Barnes Radiographic Mottle: A Comprehensive Theory, Med. Phys. vol. 9, No. 5, Sep./Oct. 1982, pp. 656–667.

Lectures Notes in Computer Science, N. Karssemeijer, A Stochastic Model For Automated Detection of Calcifications in Digital Mammograms, Dept. of Radiology, Univ. of Nijemgen, The Netherlands, title page & pp. 228–238.

*Primary Examiner*—Jack B. Harvey
*Assistant Examiner*—X. Chung-Trans
*Attorney, Agent, or Firm*—Oblon, Spivak, McClelland, Maier & Neustadt

[57] ABSTRACT

A method of computerized detection of clustered microcalcifications in digital mammograms, including obtaining a digitized mammogram, deriving a difference image signal from the digitized mammogram, performing global grey-level thresholding, area filtering, and local grey-level thresholding on the difference image, in that order, performing a texture discrimination of the signal extracted from the previous step, performing a cluster filtering technique on the texture discriminated signals to identify locations in the digitized mammogram corresponding to candidate clustered microcalcifications, performing a feature extraction step in which the area, contrast and background pixel values of signals corresponding to the candidate clustered microcalcifications in the original image are extracted, performing thresholding tests based on the extracted features to eliminate from the candidate clustered microcalcifications particular candidate clustered microcalcification identified as corresponding to false-positive identifications, cluster filtering the remaining candidate clustered microcalcifications to eliminate further candidate clustered microcalcifications which are not sufficiently clustered, and outputting to a radiologist an image indicating, by use of arrows, the positions of the remaining clustered microcalcifications.

26 Claims, 18 Drawing Sheets

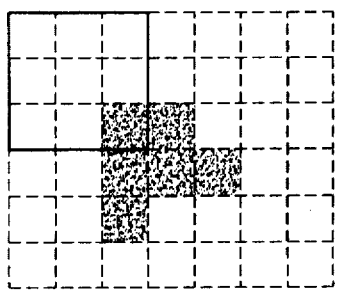
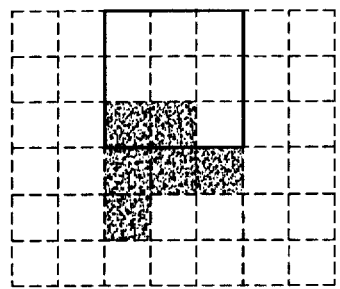
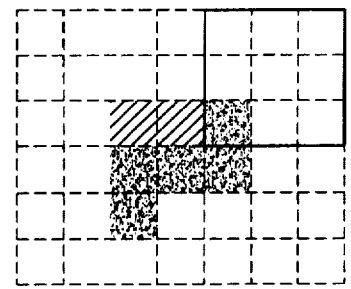
*FIG. 8a*       *FIG. 8b*       *FIG. 8c*
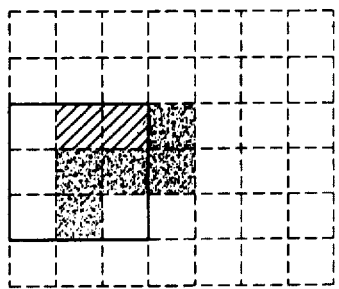
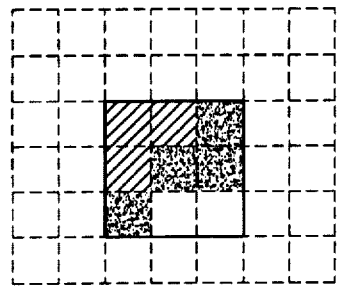
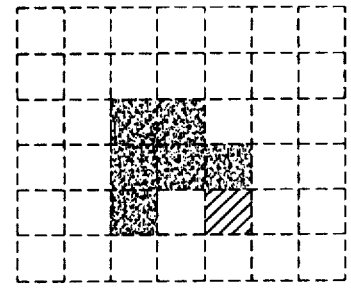
*FIG. 8d*       *FIG. 8e*       *FIG. 8f*
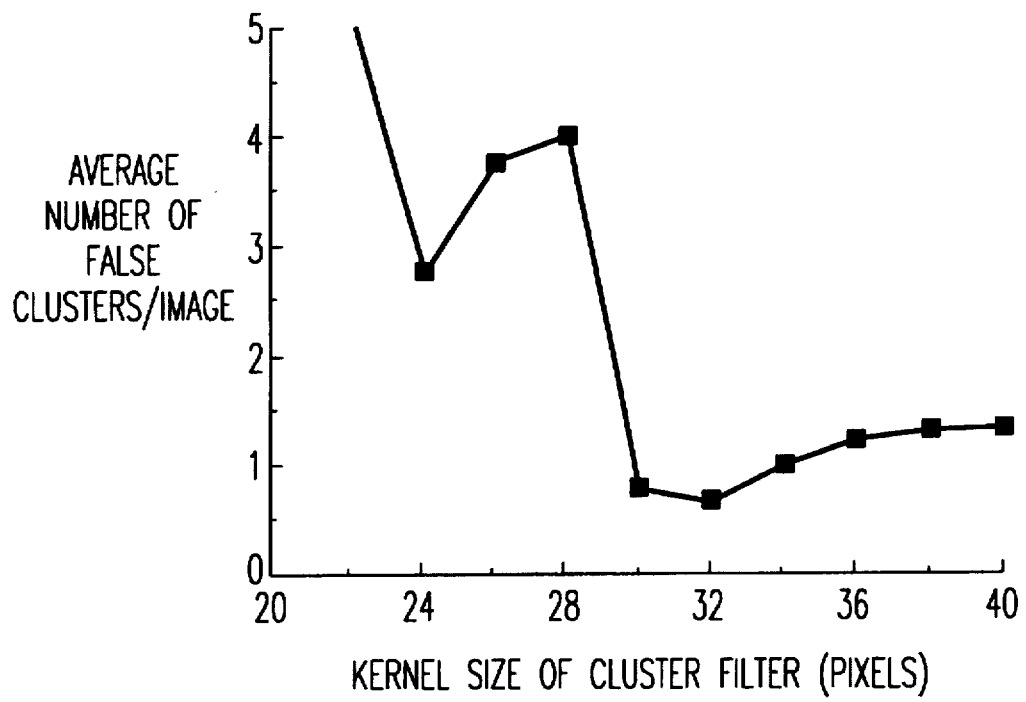
*FIG. 9*

METHOD FOR COMPUTER-AIDED DETECTION OF CLUSTERED MICROCALCIFICATIONS FROM DIGITAL MAMMOGRAMS

The present invention was made in part with U.S. Government support under grant numbers CA 24806, 47043 and 48985 from the National Cancer Institute, NIH, and the Department of Health and Human Services. The U.S. Government has certain rights in the invention.

CROSS-REFERENCE TO RELATED APPLICATIONS

The present invention is related to commonly owned U.S. Pat. Nos. 4,841,555, 4,851,984, 4,907,156, 4,839,807 and commonly owned U.S. patent applications Ser. Nos. 07/383,097, 07/617,080, 07/843,715 and 07/843,721, the disclosures of which are incorporated by reference into the present disclosure.

BACKGROUND OF THE INVENTION

1. Field of the Invention

This invention relates to computer-aided detection of clustered microcalcifications from digital mammograms, and particularly to techniques for decreasing the number of false positive detections without diminishing the number of true positives detected.

2. Discussion of the Background

As part of an ongoing effort to assist radiologists in interpreting mammograms, various computer-aided-diagnosis CAD schemes for detecting clustered microcalcifications or breast masses on mammograms have been reported in the literature; namely see (1) H-P. Chan et al.: "Image feature analysis and computer-aided diagnosis in digital radiography. 1. Automated detection of microcalcifications in mammography"; Med. Phys. 14 538–548, 1987;

(2) H-P. Chan et al.: "Computer-aided detection of microcalcifications in mammograms: Methodology and preliminary clinical study"; Invest. Radiol. 23 664–671, 1988;

(3) H-P. Chan et al.: "Improvement in radiologists' detection of clustered microcalcifications on mammograms: The potential of computer aided-diagnosis"; Invest. Radiol. 25 102–1110, 1990;

(4) F-F. Yin et al.: "Computerized detection of masses in digital mammograms: Analysis of bilateral-substraction images"; Med. Phys. 18 955–963, 1991; and (5) M. L. Giger et al.: "Investigation of methods for the computerized detection and analysis of mammographic masses"; Proc. SPIE 1233 183–184, 1990.

(6) M. L. Giger et al.: "Development of a "smart" workstation for use in mammography"; Proc SPIE 1445 101–103, 1991.

(7) R. M. Nishikawa et al.: "Use of morphological filters in the computerized detection of microcalcifications in digitized mammograms"; Med. Phys. 17 524, 1990 (abstract);

(8) R. M. Nishikawa et al.: "Automated detection of microcalcifications in mammograms: New feature-extraction technique using morphological filters"; Radiology 177(p) 288, 1990 (abstract);

(9) R. M. Nishikawa et al.: "Computer-aided detection of clustered microcalcifications using digital mammograms"; Med. Biol. Engin. Comp, (Submitted April, 1992); and

(10) Fam BW, et al: "Algorithm for the detection of fine clustered calcifications on film mammograms"; Radiology 169:333–335, 1988.

(11) Spiesberger W: "Mammogram inspection by computer"; IEEE Trans. Biomed. Eng. BME-26:213, 1979.

(12) Davies DH, et al.: "Automatic computer detection of clustered calcifications in digital mammograms"; Phys. Med. Biol. 35:1111–1118, 1990.

(13) M. Grimaud et al.: "Automated detection of microcalcifications in mammograms", Radiology 177(p) 288, 1990 (abstract).

(14) S. M. Astley et al.: "Automated detection of abnormalities on screening mammograms", Radiology 177(p) 288, 1990 (abstract).

(15) S. H. Fox et al.: "A computer analysis of mammographic microcalcifications: Global approach", Proc IEEE 5th International Conf. on Pattern Recognition: 624–631, 1980.

(16) W. G. Wee et al.: "Evaluation of Mammographic Calcifications using a computer program", Radiology 116 717–720, 1975.

(17) N. Karssemeijer: "A stochastic model for automated detection of calcifications in digital mammograms", in: *Information Processing in Medical Imaging*, A. C. F. Colchester and D. J. Hawkes, Eds. (Springer-Verlag, New York) 1991, pp 227–238.

The theory is that by alerting radiologists to suspicious regions on a mammogram, the accuracy of mammography can be increased. The computer could be used as a "second opinion" by radiologists, so that in effect, each mammogram could be double read. This is important because, with several medical associations advocating periodic mammographic screening, mammography may become one of the most common types of radiographs interpreted by radiologists.

In all or most of these techniques, signals that are smaller than some predetermined size are eliminated as false signals based on the assumption that very small signals in the image are caused by noise. However, the techniques implemented have required excessive processing capability to achieve reasonably accurate detections.

One important step in a CAD system is to group or cluster microcalcifications, since clustered microcalcifications are more clinically significant than are isolated microcalcifications. In fact, clustered microcalcifications are an important early indicator of malignancy and are sometimes the only indication of breast cancer visible in the mammogram. The presence of individual (non-clustered) microcalcifications are in most cases not clinically significant. Therefore, it is more important that a computer detection scheme find clustered as opposed to individual microcalcifications. Prior techniques for finding clustered microcalcifications have met with moderate, but nevertheless limited success.

Additionally, while prior research has investigated various feature analysis techniques for the removal of false signals from mammograms, even further improvement in the number of false positive clusters detected is desired.

SUMMARY OF THE INVENTION

Accordingly, one object of this invention is to provide a new and improved method of computer aided detection of clustered microcalcifications on mammograms, whereby the accuracy of diagnosis can be improved by reducing the number of false positive detections without decreasing the sensitivity for detecting true positive microcalcifications.

Another object of this invention is to provide a novel method as above noted which uses knowledge of the physical properties of the imaging system and of the x-ray properties of tissues being radiographed to extract accurately features of imaged microcalcifications and to use these features to improve accuracy of detection of problematic microcalcifications.

These and other objects are achieved according to the present invention by providing a new and improved method of computerized detection of clustered microcalcifications in digital mammograms, including obtaining a digitized mammogram, deriving a difference image from the digitized mammogram, performing global grey-level thresholding, area filtering, and local grey-level thresholding on the difference image, in that order, performing a texture discrimination of the signal extracted from the previous step, performing a cluster filtering technique on the texture discriminated signals to identify locations in the digitized mammogram corresponding to candidate clustered microcalcifications, performing a feature extraction step in which the area, contrast and background pixel values of signals corresponding to the candidate clustered microcalcifications in the original image are extracted, performing thresholding tests based on the extracted features to eliminate from the candidate clustered microcalcifications particular candidate clustered microcalcification identified as corresponding to false-positive identifications, cluster filtering the remaining candidate clustered microcalcifications to eliminate further candidate clustered microcalcifications which are not sufficiently clustered, and outputting to a radiologist an image indicating, by use of arrows, the positions of the remaining clustered microcalcifications.

BRIEF DESCRIPTION OF THE DRAWINGS

A more complete appreciation of the invention and many of the attentive advantages thereof will be readily obtained as the same becomes better understood by reference to the following detailed description when considered in connection with the accompanying drawings, wherein:

Figure 5A:
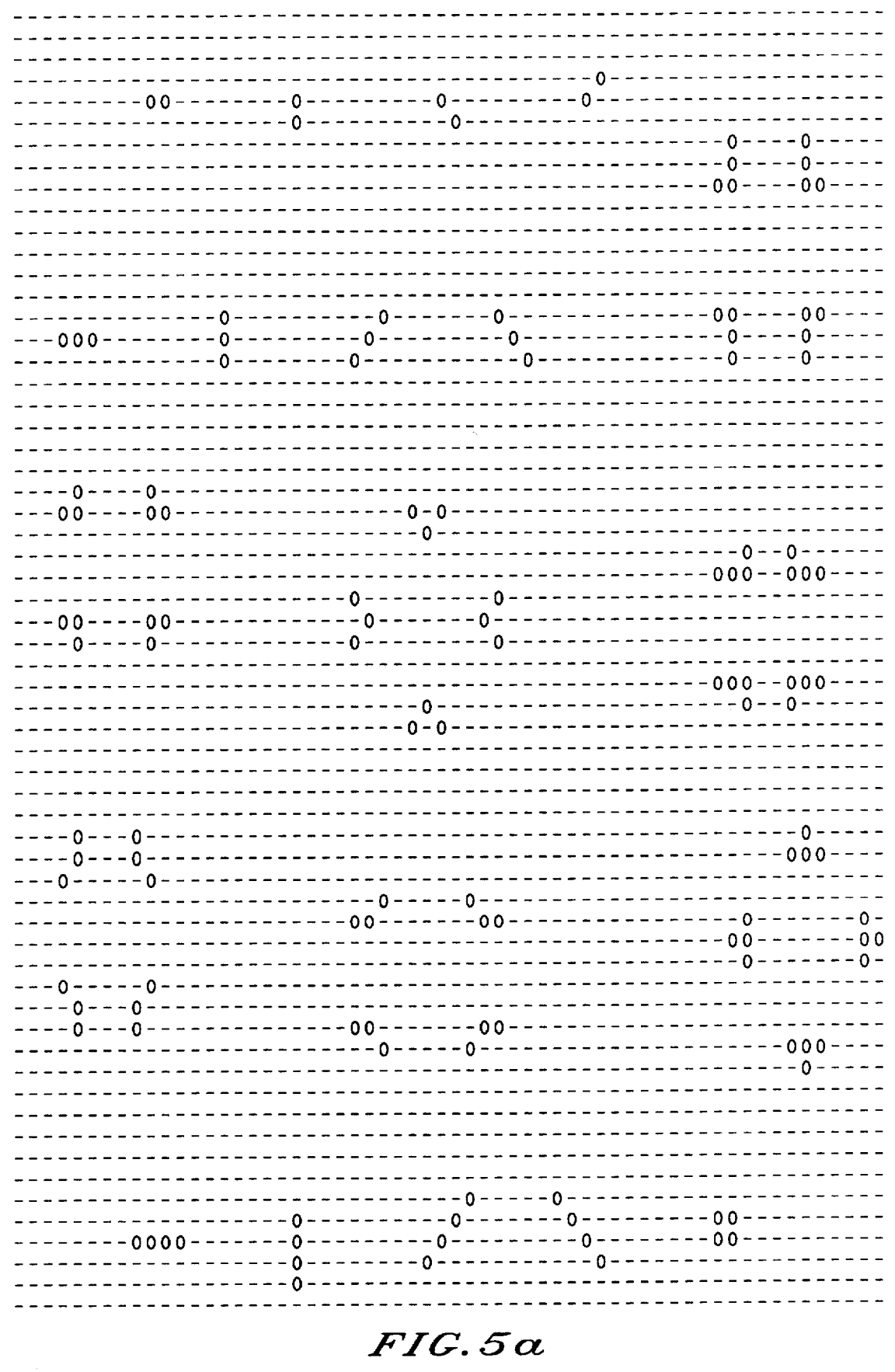
Figure 5B:
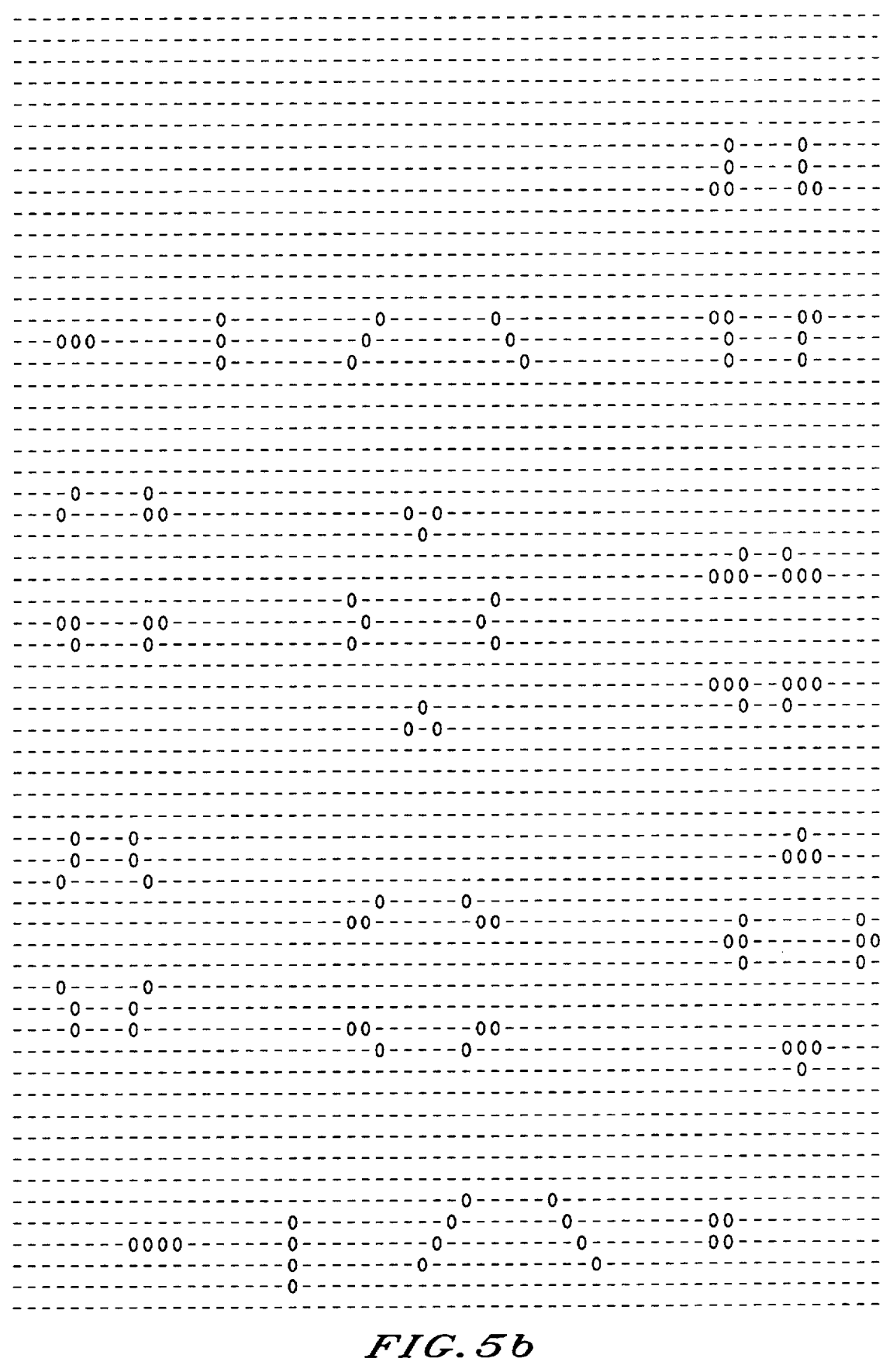

FIGS. 5a, 5b, 5c and 5d are illustrations of applications of structuring elements of FIGS. 4a, 4b, 4c and 4d in morphological erosion of the image data shown in FIG. 5e, respectively;

FIG. 8 is an illustration of the recursive area-point transformation applied to an original image containing a six-pixel signal;

FIG. 9 is a graph illustrating the effect of kernel size used for clustering on the average number of false clusters detected per image for a small database of nine images, each with at least one cluster, and with a truepositive rate of 90% for all points;

DESCRIPTION OF THE PREFERRED EMBODIMENTS

Figure 1:
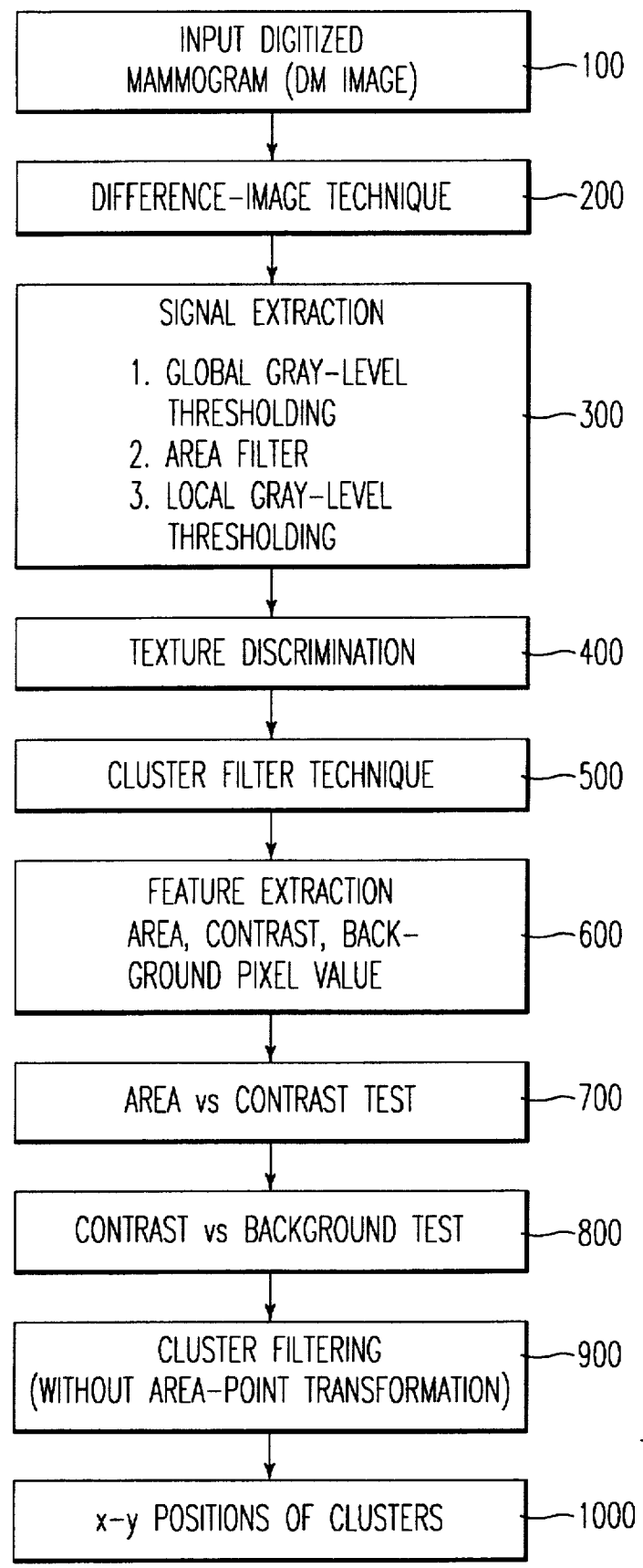
FIG. 1 is a schematic flow chart illustrating the processing steps of the method of the present invention.

Referring now to the drawings, wherein like reference numerals designate identical or corresponding parts throughout the several views, and more particularly to FIG. 1 thereof, there is shown a flow chart illustrating the sequence of processing steps performed according to the present invention. In a first step 100, a digital mammogram is obtained using conventional hardware such as computed radiography systems and digitizing conventional mammograms using a laser scanner. In step 200, a difference image is produced from the digital mammogram, as described in U.S. Pat. No. 4,907,156. Thereafter, in step 300, signal extraction is performed.

In step 300, global-grey-level thresholding, utilizing histogram techniques as described in U.S. Pat. No. 4,907,156, is performed to eliminate all but 2% of the brightest pixels in the difference image data output by step 200, thereby to extract possible microcalcifications. Then area filtering utilizing morphological erosion is performed, as described hereinafter, to eliminate very small signals caused by image noise. Next an adaptive local grey-level threshold is used to reduce further the number of false signals. The thresholding is based on the local statistics (mean and standard deviation) of the pixel values in a 5.1×5.1-mm area in the image. The threshold is set equal to a multiple of the standard deviation plus the mean. Typically multiples of 2.8–4.2 are used. The remaining signals are subjected to texture analysis in step 400 and then are subjected to a cluster filtering process in step 500, as discussed hereafter.

The cluster filtering technique performed in step 500 results in the identification of locations in the difference image which have potentially problematic microcalcifications. The difference image data in a region surrounding the locations identified in step 500 are then subjected to feature extraction processing in step 600 to determine the area, contrast (i.e., thickness) and background pixel values of the difference image data in the regions evaluated as identified in step 500. An area vs. contrast test is then performed in step 700 to eliminate a number of image locations of interest as corresponding to false positives, and a contrast vs. background test is performed in step 800, again in order to eliminate image locations determined to correspond to false positive identifications. In step 900, a cluster filtering of the remaining identified locations is performed. Clusters remaining after step 900 are then identified in step 1000 for evaluation by the radiologist.

Having provided an overview of the process of the present invention in relation to FIG. 1, specific steps in the processing are next described.

The concept of mathematical morphology is a useful one in image processing. In medical imaging applications, morphological operators have been mainly used for enhancing images. Morphological operators are also useful for filling in holes (dilation) or eliminating small signals (erosion). There are problems, however, if one has to fill in or eliminate structures that are only a few pixels in area while preserving all larger structures. In erosion, for example, the smallest symmetric kernel is a 3×3 cross and it will eliminate any structure smaller than 5 pixels in area. Thus it is not possible to eliminate only structure of area less than 5 pixels using a symmetric kernel. If only a single small asymmetric kernel is used, then it is not possible to eliminate successfully all possible shapes and orientation of smaller signals.

Figure 3:
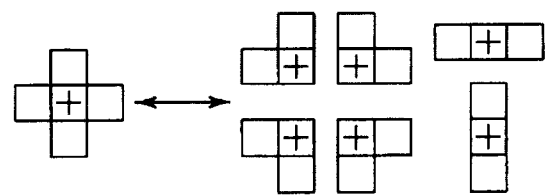
FIG. 3 is an illustration of how a symmetric structuring element can be decomposed into six asymmetric structuring elements for use in an area filter technique according to the present invention.
Figure 4A:
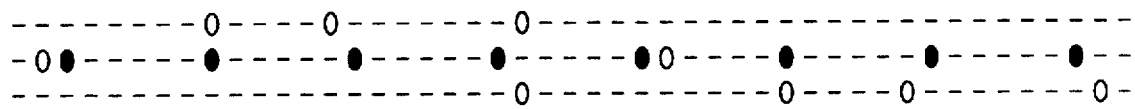
FIGS. 4a, 4b, 4c and 4d are illustrations of four different sets of structuring elements.
Figure 4C:
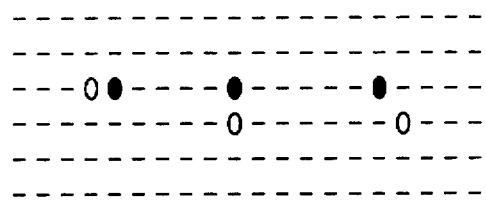
Figure 4D:
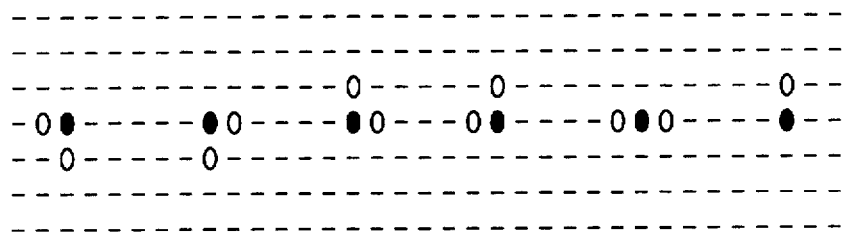
Figure 4B:
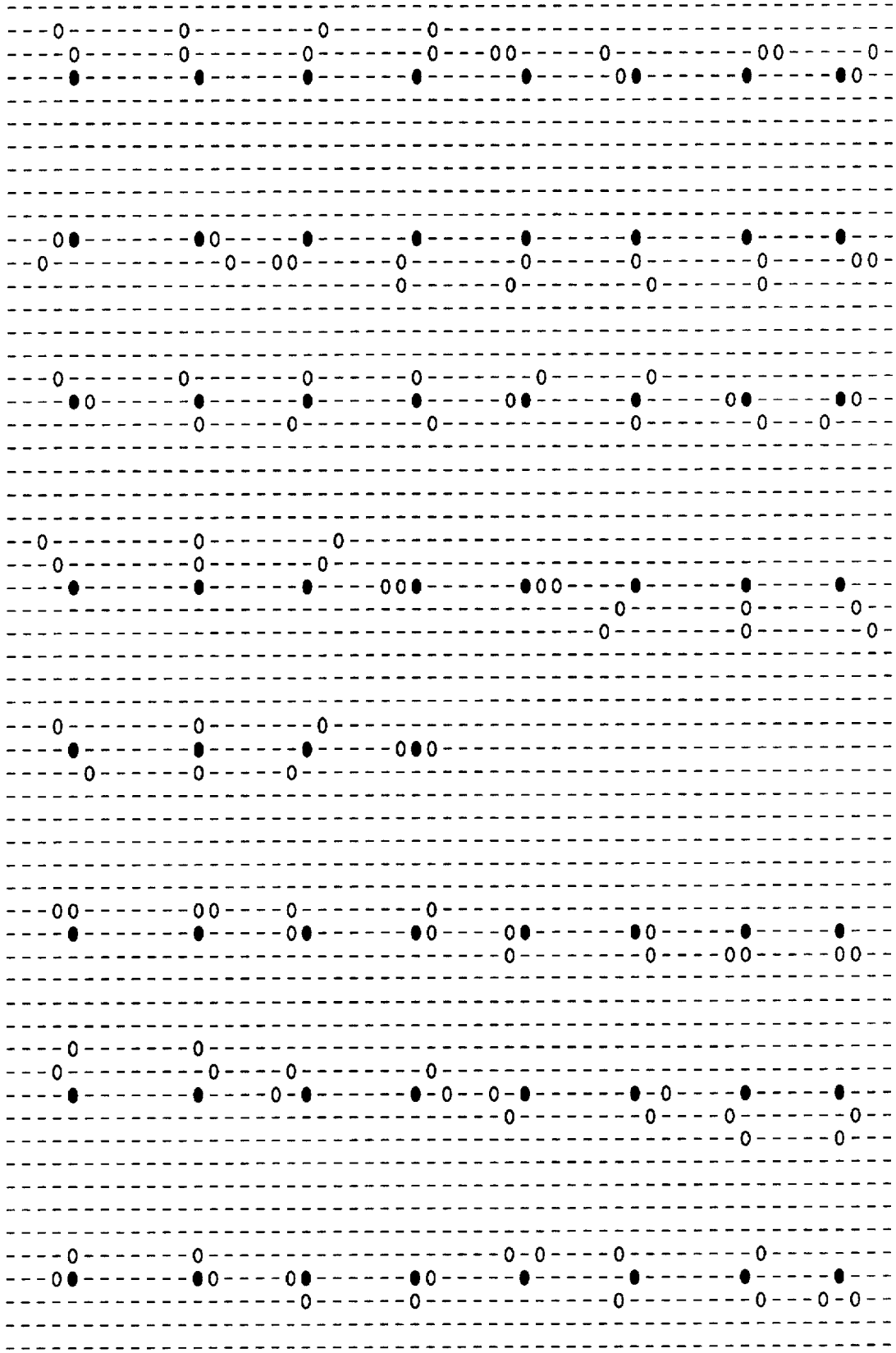
Figure 5C:
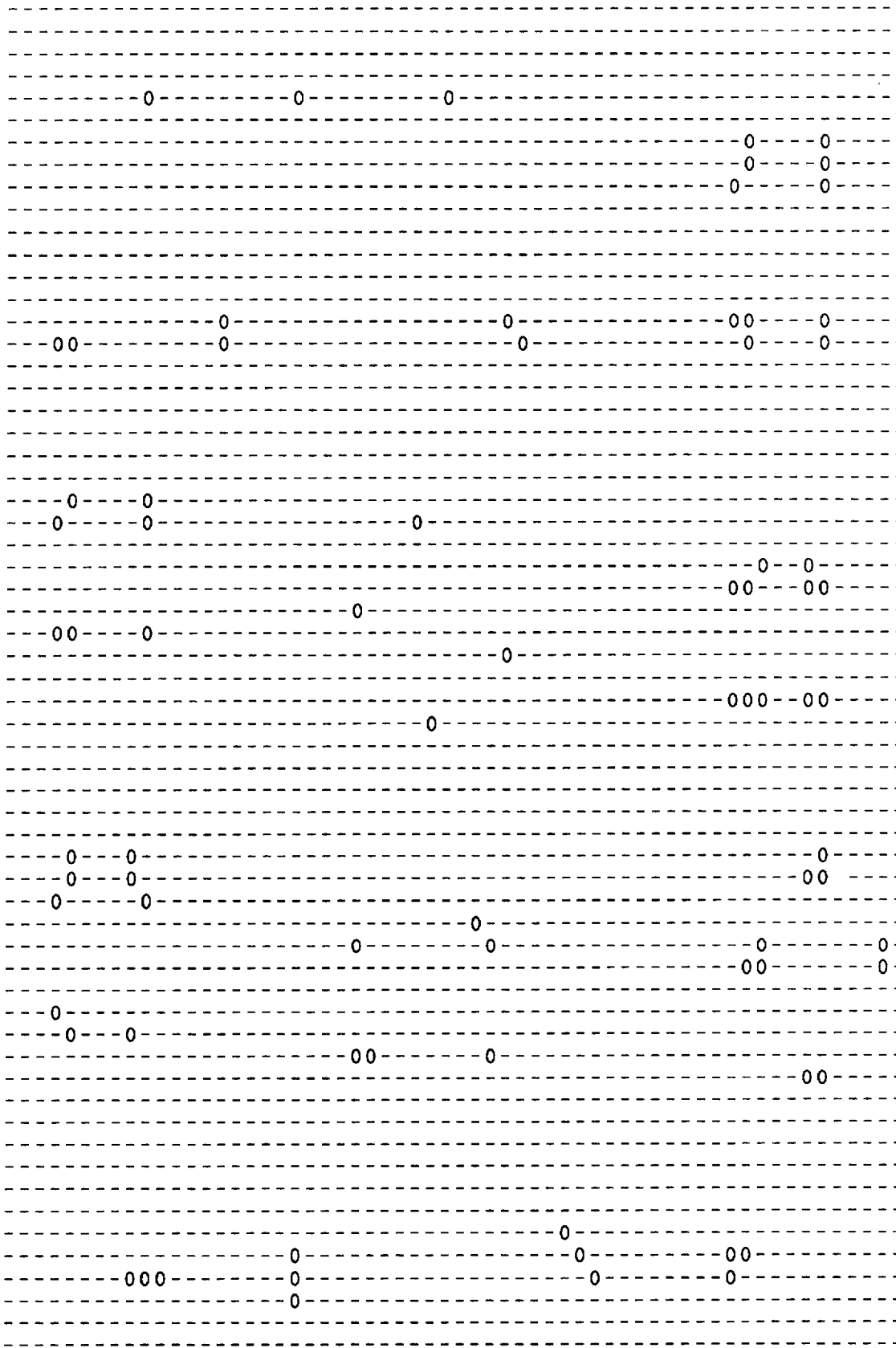
Figure 5D:
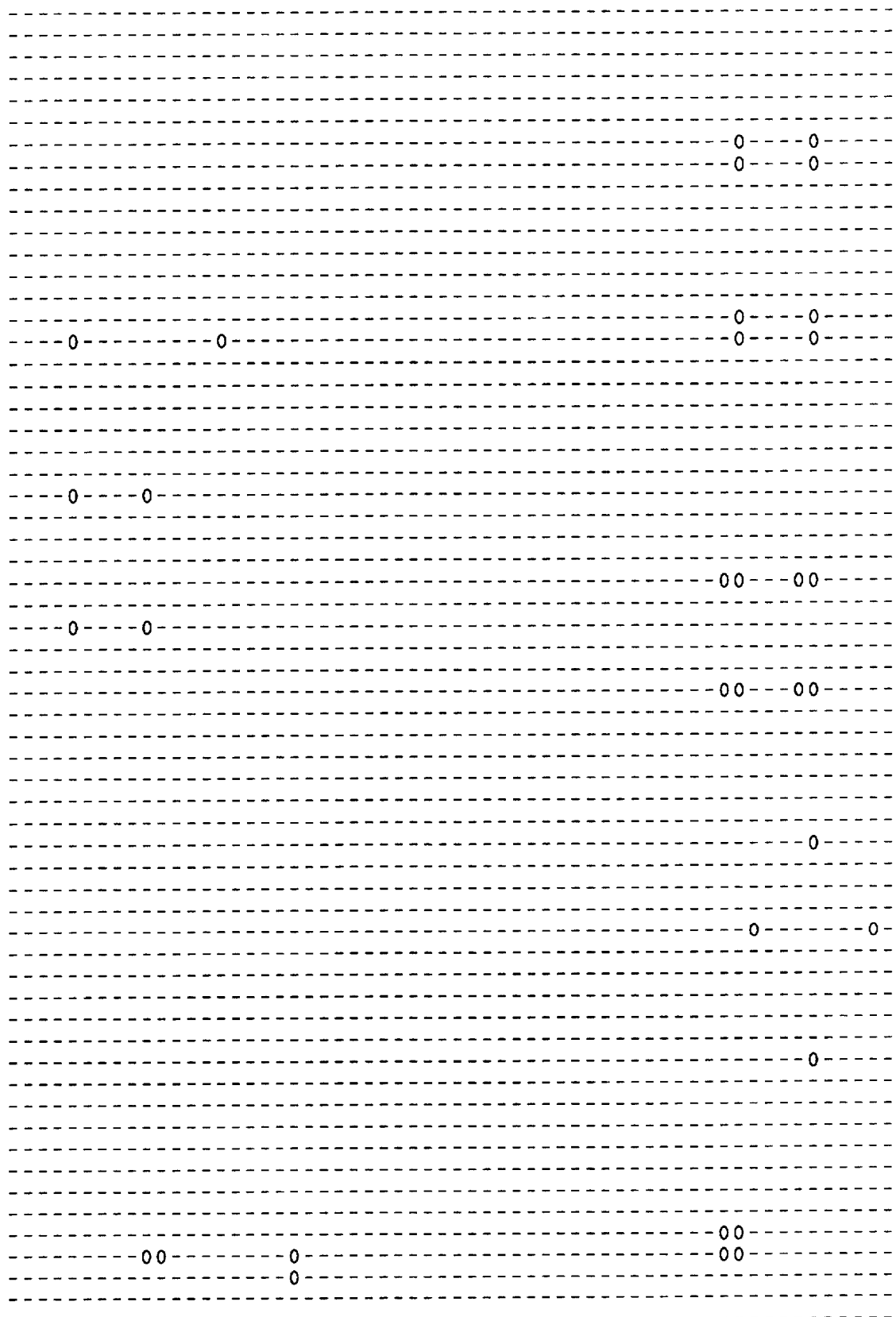

The solution is to decompose the 3×3 cross into smaller asymmetric kernels. An example of such a decomposition is shown in FIG. 3. To implement these structuring elements as morphological operators, four different combinations are possible:

$$H=(I\oplus K_1)\oplus(I\oplus K_2)\oplus \ldots \oplus(I\oplus K_N) \quad (1)$$

$$H=(I\ominus K_1)\ominus(I\ominus K_2)\ominus \ldots \ominus(I\ominus K_N) \quad (2)$$

$$H=(I\ominus K_1)\ominus(I\ominus K_2)\oplus \ldots \oplus(I\ominus K_N) \quad (3)$$

$$H=(I\oplus K_1)\ominus(I\oplus K_2)\ominus \ldots \ominus(I\oplus K_N) \quad (4)$$

where I is the original image, H is the resulting image, $K_1$, $K_2$, ..., $K_N$ are the asymmetric structuring elements, N is the total number of structuring elements, $\oplus$ is for erosion, and $\ominus$ is for dilation.

The operators in Eqs. (1) and (2) are identical to erosion and dilation with the undecomposed structuring element; that is, a structuring element that is formed by the superposition of all the asymmetric structuring elements. Equations (3) and (4) are unique erosion and dilation operations capable of discriminating very small structures. Depending on the size, shape and number of structuring elements, various sizes of structures can be eliminated from an image as discussed hereinafter.

Figure 2:
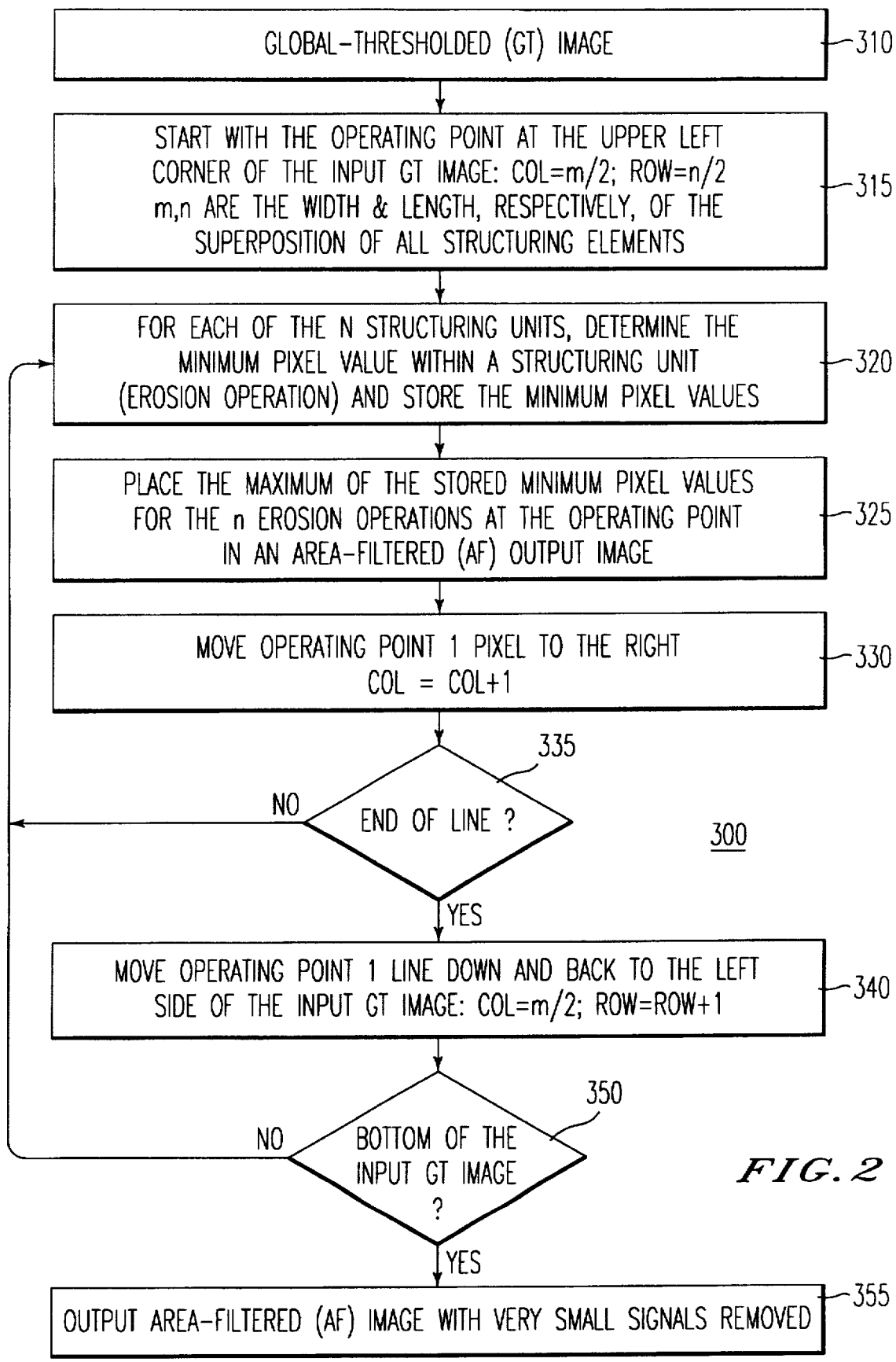
FIG. 2 is a more detailed schematic flow chart illustrating the signal extraction processing steps of the method shown in FIG. 1.

Next discussed in relation to FIG. 2 are the processing steps specifically performed in area filtering according to the present invention. The global-thresholded image data are obtained in step 310 from the difference image produced in step 200 (FIG. 1). In step 315 a starting operating point is selected at the upper left corner of the image. In step 320, each of the structuring elements is then overlaid with the operating point and the minimum pixel value of the overlaid pixels for each structuring element is determined and temporarily stored. In steps 325, the maximum of the stored minimum pixel values derived by overlaying the structuring elements over the same operating point is determined, and that maximum pixel value is substituted for the pixel value of the pixel at the operating point.

In step 330, the operating point is scanned to the right, and if the next operating point is not at the end of the line (step 335) steps 320, 325 and 330 are repeated for the next operating point. When all the operating points of a line are processed, step 335 sends processing to step 340 to increment processing on the far left operating point one line down. If that next line down is the bottom of the image as determined in step 350, area filtered image data with very small signals removed are output in step 355. If the next line is not the bottom of the image, step 350 sends processing to step 320 for processing of the operating points on the next line. Thus, morphological erosion processing continues until all operating points have been processed. The above processing corresponds to Equation 3 above presented.

FIGS. 4a–4d illustrate four different sets of structuring elements. The first set (FIG. 4a) is a complete set of all structuring elements with area of 2 pixels; it consists of 8 elements. The second set (FIG. 4b) is a complete set of all structuring elements with area of 3 pixels; it consists of 60 elements. The third set (FIG. 4c) is a subset of the first set and contains only 3 of the 8 elements. The fourth set (FIG. 4d) is a subset of the second set and consists of 6 elements. The following discussion examines the different effects of each set of structuring elements. Recently R. P. Loce and E. R. Dougherty ("Facilitation of optimal binary morphological filter design via structing element libraries and design constraints", Optical Engineering, vol. 31(5), 1008–1025, 1992), described other sets of structuring elements.

Figure 5E:
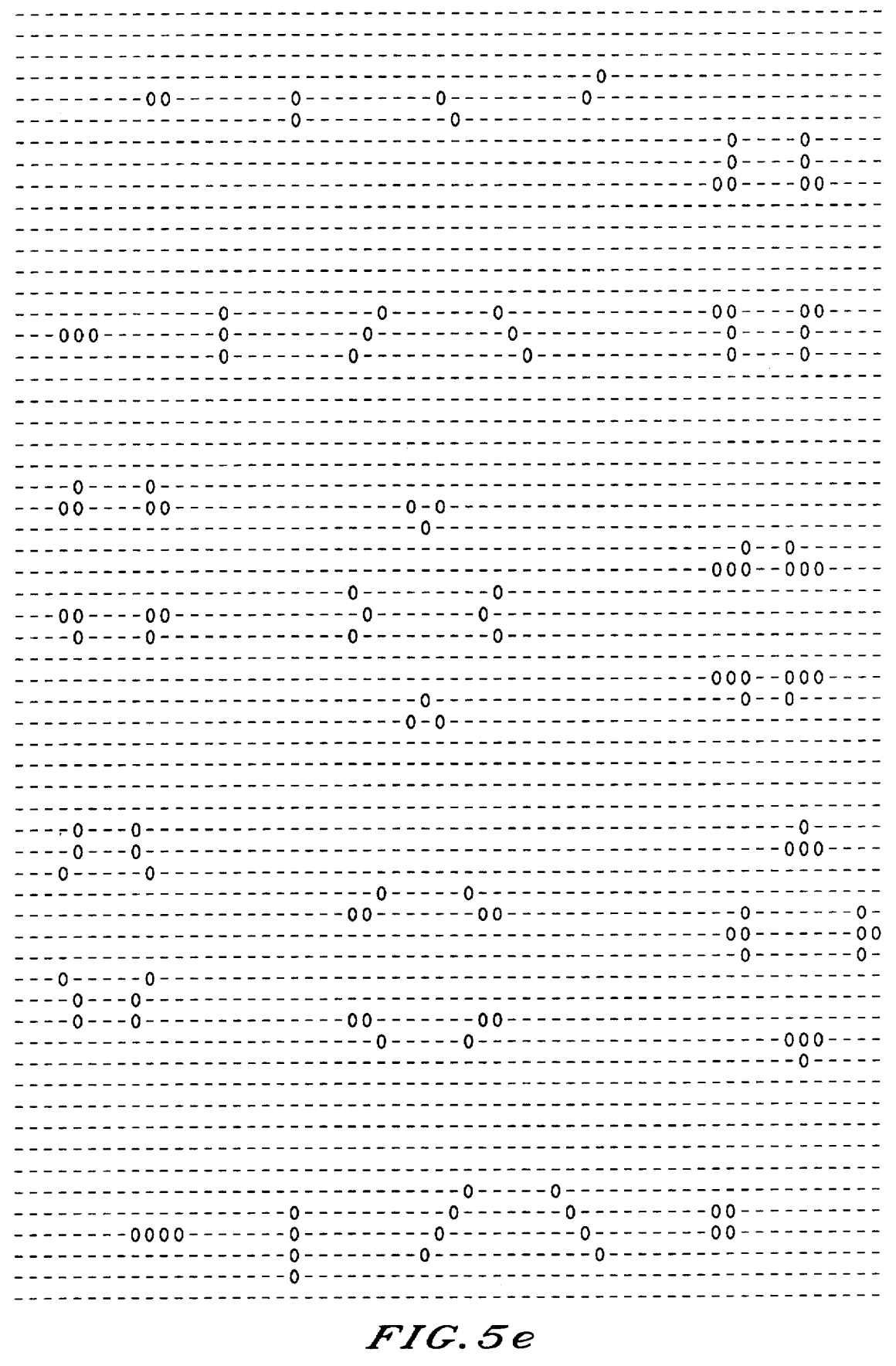

The effect of using each of the three structuring-element sets shown in FIGS. 4a–4d in erosion is respectively shown in FIGS. 5a–5d. Notice in FIGS. 5a and 5b, structures are either eliminated or remain unaltered compared to the original image, shown in FIG. 5e. When an incomplete set of structuring elements is used, some of the remaining structures are eroded, and some structures with area of 3 pixels are eliminated, i.e., those that lie along diagonals. The advantage of using the smaller set of structuring elements is that the time to complete the erosion is reduced by at least 50% (see Table I). For digitized radiographic images it is unlikely that any structure would appear as a straight diagonal, one pixel "wide". The effect on performance of the CAD scheme by the above-described area filtering is significant. For the same true positive detection rate of 85%, the average number of detected false positives per image is reduced from over 8 to 2.5 when the present area filter is used compared to the previous area test.

TABLE I

| Set | Size of Structuring Element | Number of Structuring Elements | Relative Time |
| --- | --- | --- | --- |
| a | 2 | 8 | 2 |
| b | 3 | 60 | 10 |
| c | 2 | 3 | 1 |
| d | 3 | 6 | 2 |

By using multiple structuring elements, one can selectively erode the image. With complete sets of structuring elements, only small structures are removed from the image; all other structures remain unaltered. This is not possible with a single structuring unit. Therefore the use of multiple structuring elements is well suited for the present application of removing only noise from the image. Whereas erosion will remove noise "spikes" from an image, dilation with multiple structuring elements can be used to remove noise "depressions" without altering other structures in the image. Combined together, erosion and dilation can be used to reduce high frequency random fluctuations in an image while preserving larger structures.

As noted, the present CAD scheme performs better when the present area filter using plural structuring elements is used instead of the previous area test. A further improvement in CAD performance is a result of the ordering of area discrimination and the local adaptive thresholding. Because non-linear operators are used, ordering of area filtering and local thresholding is important. If local thresholding were performed first, then many small signals are created, the smallest of which are eliminated by the area test. Some of these small eliminated signals may be true microcalcifications. A lower threshold value would create larger signals that would not be eliminated by the area test, but would create many more false signals. By performing the area discrimination first, only "true" noise pixels are eliminated. Then after local thresholding some small signals are again created but they have already passed the area discrimination technique and therefore remain in the image.

After area filtering in step 300, local thresholding as described above is performed. Thereafter, texture discrimination in step 400 is performed. In this step, background trend correction is performed, and the Fourier power spectrum and the first moment of the power spectrum is determined (see U.S. Pat. No. 4,851,984). Signals in the thresholded image whose first moment of the power spectrum is greater than 3.0 cycles/mm are set to background value (in this case background has a value of 512). The result is a processed image containing possible microcalcifications.

Following step 400, a novel cluster filter technique according to the present invention is performed in step 500 (FIG. 1). Step 500 identifies locations in the image corresponding to group or cluster microcalcifications. Grouping is performed using two basic steps. First, signals (possible microcalcifications) that may be several pixels in area are reduced to single pixels by means of a recursive area-point (A-P) transformation. Second, the number of signals (pixels whose values are greater than background) within a small region, typically 3.2×3.2 mm, are counted. If three or more signals are presented, they are preserved in the output image otherwise they are not. In this way, isolated signals are eliminated. Furthermore, this method can eliminate falsely detected clusters that were found by the inventors' previous detection scheme based on the spatial distribution of signals within the cluster.

The present approach to detecting clustered microcalcifications is first to identify individual signals (possible microcalcifications) and then to group or "cluster" these individual signals. Prior to the present invention, a cluster was defined as a group of three or more signals within some predefined distance of the center of a growing cluster. This technique has several drawbacks. First, the exact spatial location (x,y) of all potential signals in the mammogram must be determined. Second, signals were sometimes grouped incorrectly, particularly when the signals cover a large area compared to the clustering radius. Third, there were a large number of false clusters detected by this technique.

The cluster filter technique of the present invention can efficiently group signals without knowledge of their exact spatial location and also can eliminate certain false clusters based on the spatial distribution of signals within the cluster. In addition, a recursive transformation that can reduce a large-area signal so that it is represented by a single pixel is employed.

Figure 6:
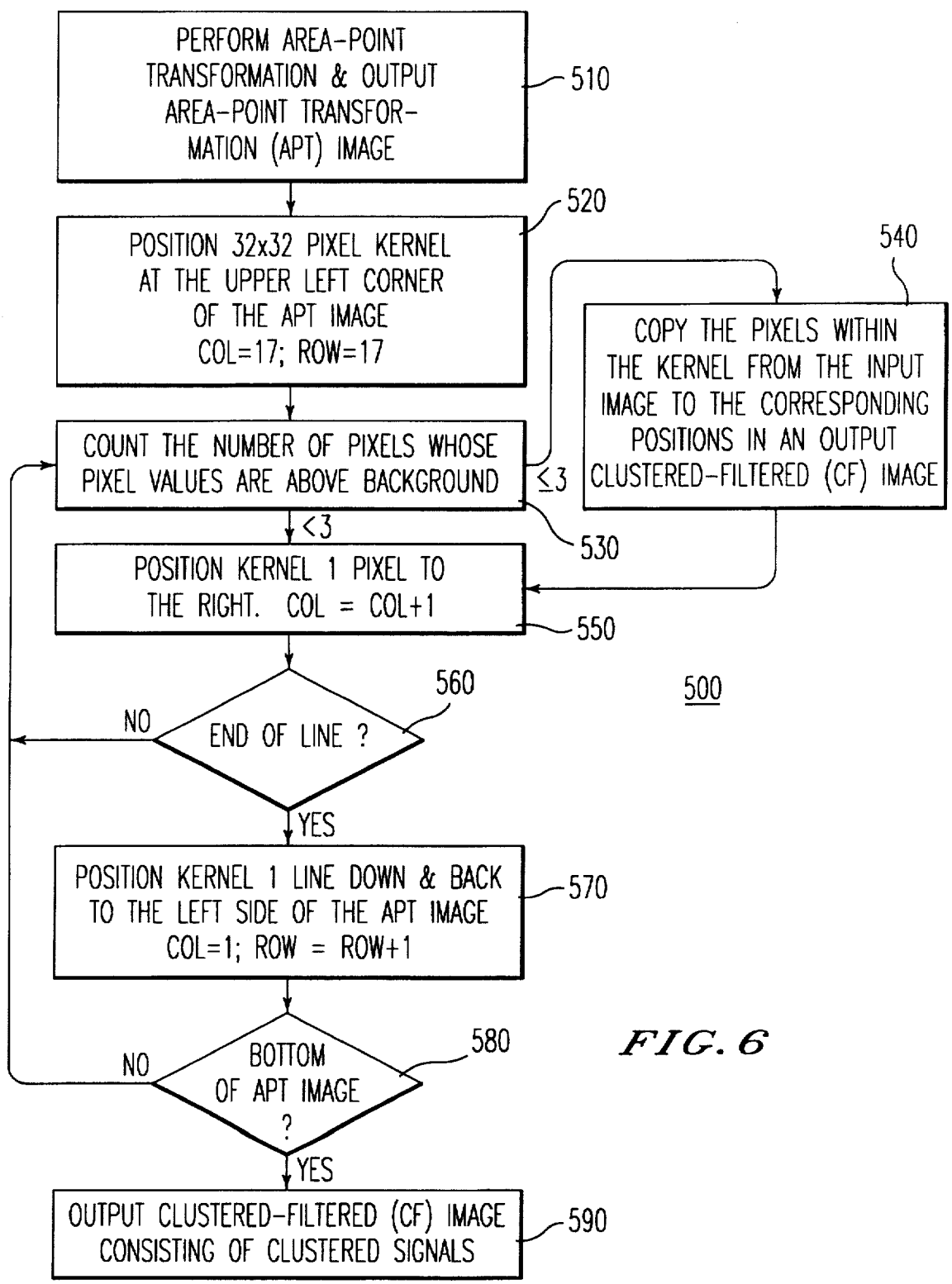
FIG. 6 is a flowchart of the clustering filtering technique employed according to the present invention.
Figure 7:
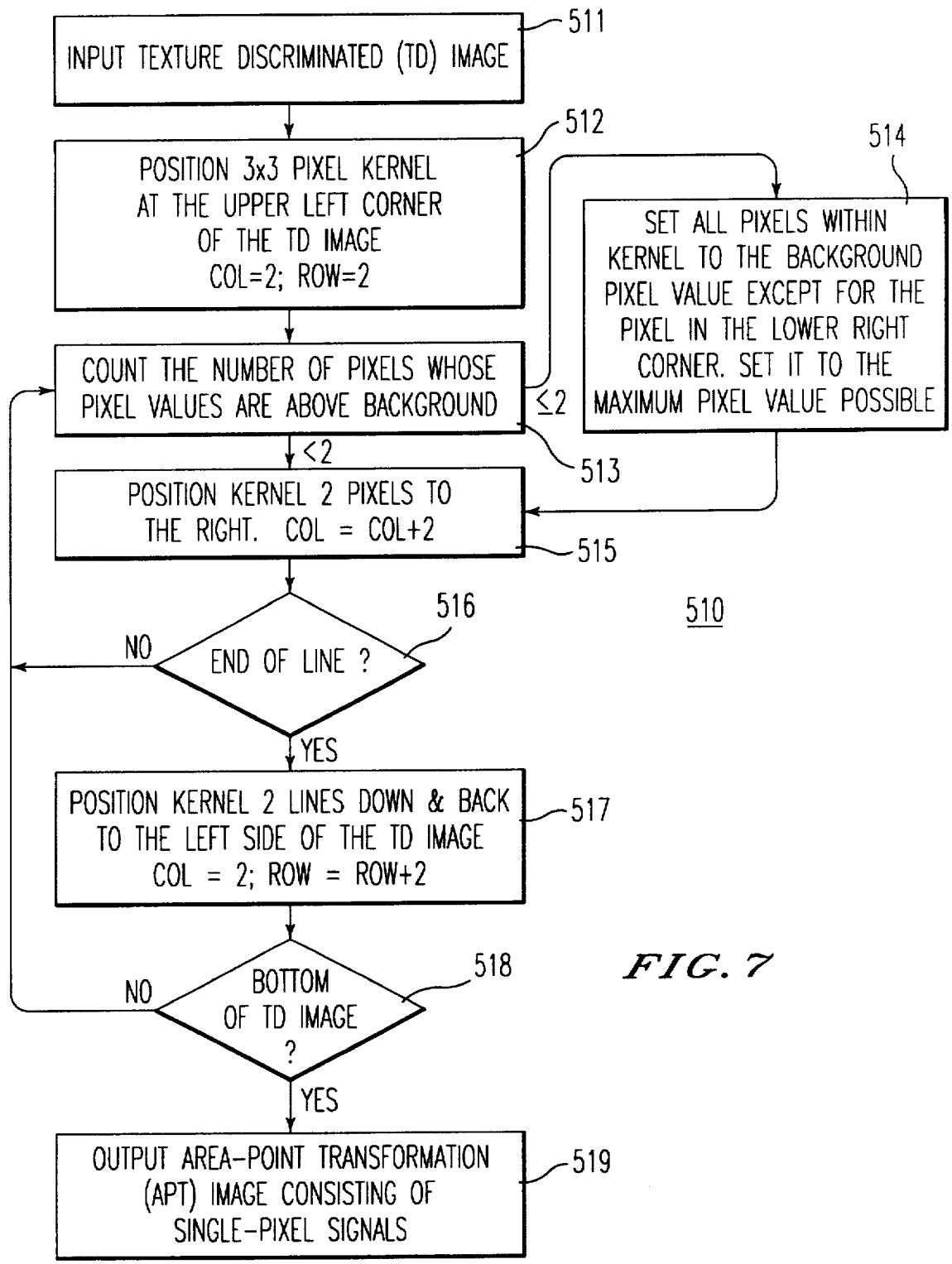
FIG. 7 is a flowchart of the area point transformation performed in the cluster filtering technique of the present invention.

FIGS. 6 and 7 illustrate the processing steps performed in the cluster filtering technique of the present invention. In FIG. 6, the first step, step 510, is to perform an area-point transformation, the details of which are shown in FIG. 7. The purpose of the area-point transformation is to identify the location in the processed image of those signals which may in fact correspond to microcalcifications, and to identify those locations by a single pixel.

Referring to FIG. 7, the area-point transformation begins with step 511 in which the threshold image after texture discrimination (the grey-scale image) is obtained. In step 512, a 3×3 pixel kernel is positioned at the upper left corner of the image and used as a template to evaluate the values of the pixels overlaid by the kernel. In step 513, the number of pixels whose pixel values are above the background is counted and if the number if greater than or equal to 2, in step 514 all the pixels within the kernel are set to the background pixel value except for the pixel in the lower right corner, which is set to the maximum pixel value possible. Processing then proceeds to step 515. If the count result of step 513 is less than 2, processing also proceeds to step 515. In step 515, the 3×3 kernel is positioned 2 pixels to the right and in step 516 it is determined whether the new position of the pixel kernel is at the end of the line. If "no", steps 513–515 are repeated for the new position of the pixel kernel, and if "yes", the kernel in step 513 is positioned two lines down and back to the left side of the image. In step 518 it is determined whether or not a new position of the kernel is at the bottom of the image, and if "no", steps 513–517 are repeated for the new position of the kernel. If the result of step 518 is "yes", then the resultant image of single pixel signals is output in step 519. The image output in step 519 has the pixel values of various pixels set to be either background (512) or the maximum pixel value possible (1023), to signify possible locations of signals which may involve microcalcifications.

A hypothetical example of the area-point (A-P) transformation above discussed in relation to FIG. 7 is shown in FIG. 8. Note that the pixel in the transformed image does not correspond to the center position of the signal in the original image, but is at most 2 pixels from the edge of the signal. For the present application this is not a problem.

This recursive A-P transformation will not work as expected if the signals that are to be reduced are V-shaped or Y-shaped. If the two arms of the V or Y are more than 3 pixels apart, then the signal will be reduced to two pixels and not one. A morphological closing operator could be performed before the A-P transformation to ensure all signals are compact ones. From a clinical perspective, however, transforming V- or Y-shaped signals into two separate signals is not necessarily bad. Microcalcifications that have these shapes indicated have a high probability of malignancy. Counting them as two signals instead of one, effectively places more emphasis on them and reduces the probability that they will be eliminated by the clustering transformation.

Referring again to FIG. 6, the binary image produced in step 519 is output from the area-point transformation step 510 and further processed in step 520 to determine whether or not a cluster exists.

Whether or not a cluster exists is determined based on whether or not within a predetermined sized kernel overlaid on the binary image a predetermined number of pixels having the value "1023" exists. Thus, in step 520 in FIG. 6, a 32×32 pixel kernel is positioned at the upper left corner of the image and in step 530 the number of pixels in the binary image whose pixel values are "1023" is counted. If that number is greater than or equal to 3 in step 540, the pixels within the kernel from the binary image are copied to a corresponding binary output image. If the number counted in step 530 is less than 3, the 32×32 pixel kernel is positioned by one pixel to the right. If that new position is not the end of the line, as determined in step 560, steps 530, 540 and 550 are repeated. If the new position is at the end of the line, as determined in step 560, the kernel is positioned one down and back to the left side of the image in step 570. Thereafter, if the new image is not at the bottom of the image, steps 530, 540, 550, 560 and 570 are repeated. If the new position is at the bottom of the image, an output binary image identifying locations of clustered signals is output.

To determine the effect of the clustering kernel size on the performance of the present CAD scheme, the inventors examined the percentage of true clusters detected versus the average number of false clusters detected in 9 test images for different kernel size. For each kernel size, different true-positive and false-positive rates were obtained by changing the local grey-level, threshold value. FIG. 9 shows the average number of falsely detected clusters per image as a function of the kernel size when 90% of true clusters are detected. For each point, the local threshold value was varied to maintain the overall scheme's sensitivity at 90%. The kernel of 32×32 pixels gives the lowest number of false clusters detected per image.

Figure 10:
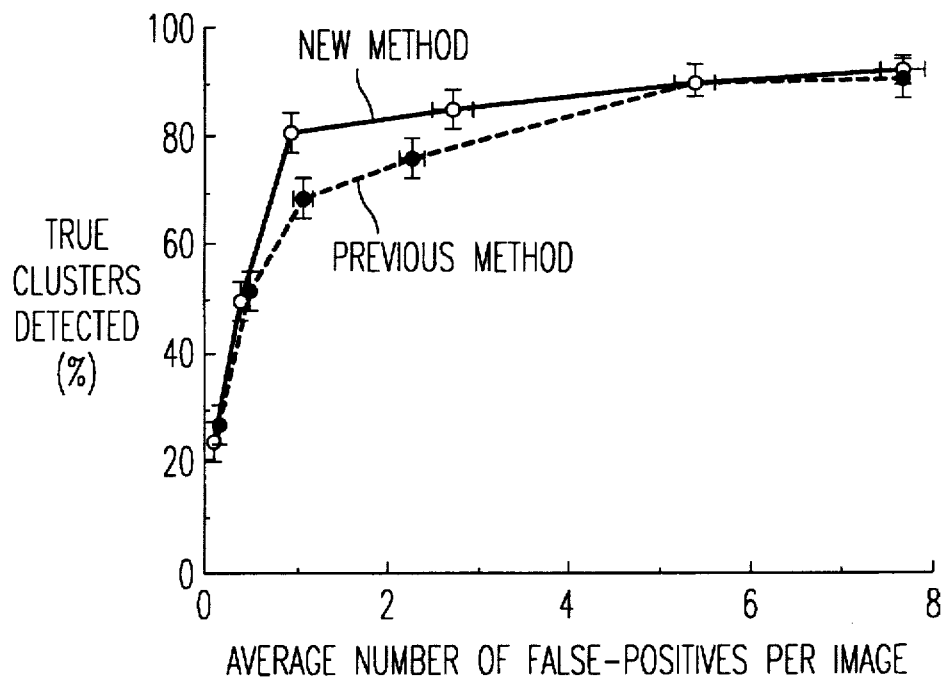
FIG. 10 is a graph comparing the performance of the computer detection scheme of the present invention utilizing the present clustering technique in comparison with the inventors previous clustering technique for a database consisting of 78 cases, half of which included no clusters.

FIG. 10 compares the performance of the present CAD technique when the disclosed clustering technique is used versus when the inventors' previous clustering technique is used. (In the previous clustering technique, the centroid of the two closest signals is used as the center of a circle of diameter of 6 mm for searching the next closest signal within the circle. The centroid position is then updated for the three signals and is used as the center of the circle. The process continues until no new islands can be found within the circle, and the group of signals within the circle is defined as a cluster.) The graph shows the percentage of true clusters detected versus the average number of false detections per image. The points on a curve were generated by changing the local grey-level threshold value. The curves are the averages of 100 subsets of 60 cases randomly selected from a total of 78 mammograms. The error bars represent the standard deviation in the means. It should be noted that the curves of the average values agree to within 1% of the curve when all 78 mammograms are used at once. There is a marked improvement in performance when the present clustering technique is used. The average number of false-positive clusters detected per image can be decreased from 4.2 to 2.5 while maintaining a sensitivity of 85%, i.e., no true clusters are eliminated during the clustering phase.

The present clustering technique for grouping signals improves the performance of our CAD scheme. The clustering technique can only eliminate isolated signals from the final image. Therefore, for a given local-threshold level, the sensitivity of the CAD scheme can not be increased by using the new technique, but the number of false clusters can be reduced. From FIG. 10, it is apparent that there is a net gain from implementing the new clustering technique. This gain is the result of a lower local-threshold value being used with the present clustering method than could be used with the old method. Normally a lower local-threshold value will increase both the sensitivity and the false-positive rate. With the present clustering method, however, there is a large decrease in the number of false clusters detected. The result is improved performance at the lower local-threshold value when the new clustering technique is used. For example, at a local-threshold value of 3.4 times the standard deviation in a local neighborhood, the old clustering method produced a sensitivity of 90.2% with 11.9 false clusters per image. Using the present clustering technique with a local-threshold value of 3.2 times the standard deviation, the same sensitivity can be obtained with 7.6 false clusters per image. At this lower local threshold, the old method would have produced a sensitivity of 95.1% with 21.6 false clusters per image.

Figure 11:
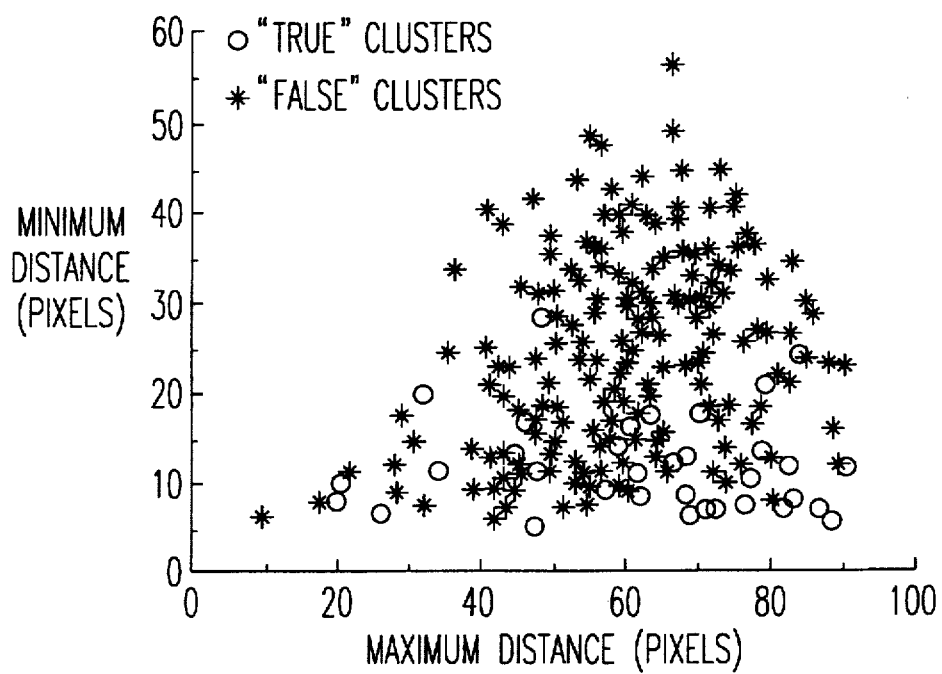
FIG. 11 is a graph illustrating the relationship between the maximum and minimum distance between any two signals within a cluster and shows data for 37 true clusters (given by circles) and for 206 false clusters (given by crosses) that were found using the inventors' previous clustering technique.

The reason for the large decrease in detected false clusters can be seen in FIG. 11 where the maximum distance between any two signals in a cluster is plotted against the distance between the closest signals in the cluster for both true clusters and false-positive clusters found by the CAD scheme using the previous clustering method. For the true clusters, the minimum distance between two signals in a cluster is less than 32 pixels, whereas for many false-positive clusters the minimum distance is greater than 32 pixels. One possible reason for this is that random fluctuations (noise) in the mammogram can produce false signals. These would tend to be somewhat uniformly distributed over a local area, whereas true clusters are a result of some local physiologic process and they tend to be more closely grouped in a defined area. Since the new clustering method would eliminate any potential cluster in which the distance between nearest neighbors is greater than the length of the kernel used in the technique, the number of false-positive clusters can be reduced without reducing the number of true clusters detected.

FIG. 10 also indicates that an improvement in performance is obtained only when the average number of false clusters per image is less than 5 per image. For points above 5, the local-threshold value will be low. As the local-threshold value decreases more false signals will be detected and the average number of signals detected per cluster will increase. Since the signals in false clusters can be randomly distributed within the cluster, the more signals present in the cluster, the higher the likelihood that there will be 3 or more within a 32×32-pixel areas. Thus, the present clustering technique is less effective at low local-threshold values (high false-positive rates).

It is noted that radiologists often use at least 5 microcalcifications in a 1-cm square area as their definition of a cluster. This is different than the present criterion, which requires at least 3 signals within 3.2-mm-square area (32×32 pixels). If the radiologists' definition of a cluster is used, the performance of the CAD scheme would be lower—the number of false positives would increase. In the present computer scheme, the image is heavily filtered and processed, so that while we are able to detect a high percentage of the clusters, less than 50% of the true microcalcifications are detected. Whereas the true clusters may contain 8 microcalcifications, the CAD technique may only detect 3 of them in the cluster. Furthermore, because the present invention detects very subtle clusters, the present invention is very sensitive to the noise (quantum and film mottle) in the mammogram. In a 1-cm-square area of the film, it is very likely that the noise in the image would produce 5 false signals leading to a high false-positive rate. Therefore, the definition of a cluster employed in the present invention, which differs from that used clinically, is necessary for the present technique to be effective.

Figure 12:
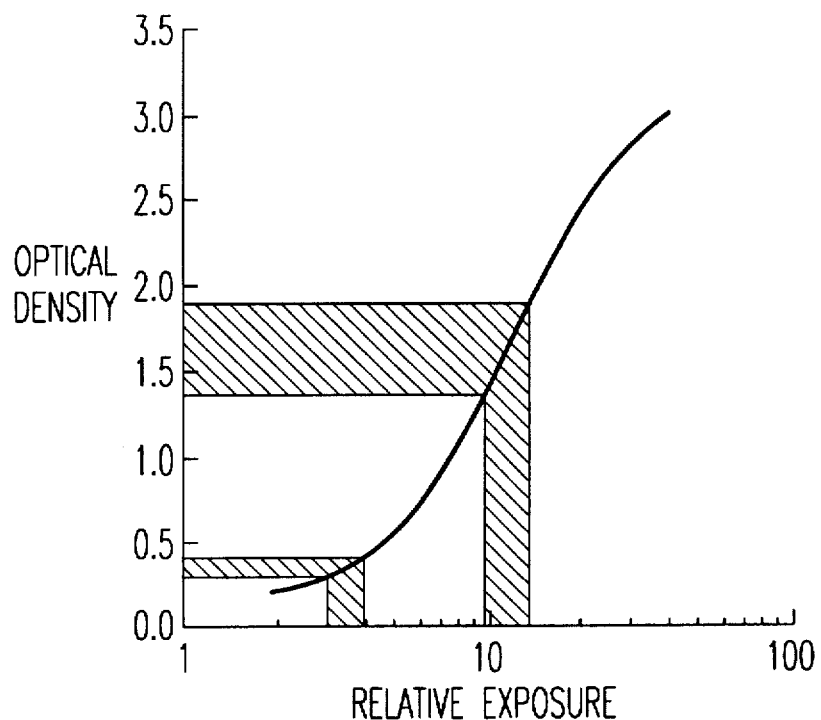
FIG. 12 is graph illustrating the characteristic curve of a screen-film system used from mammography and illustrates that the signal's radiation contrast is amplified non-linearly to result in the radiographic contrast of a signal.
Figure 13:
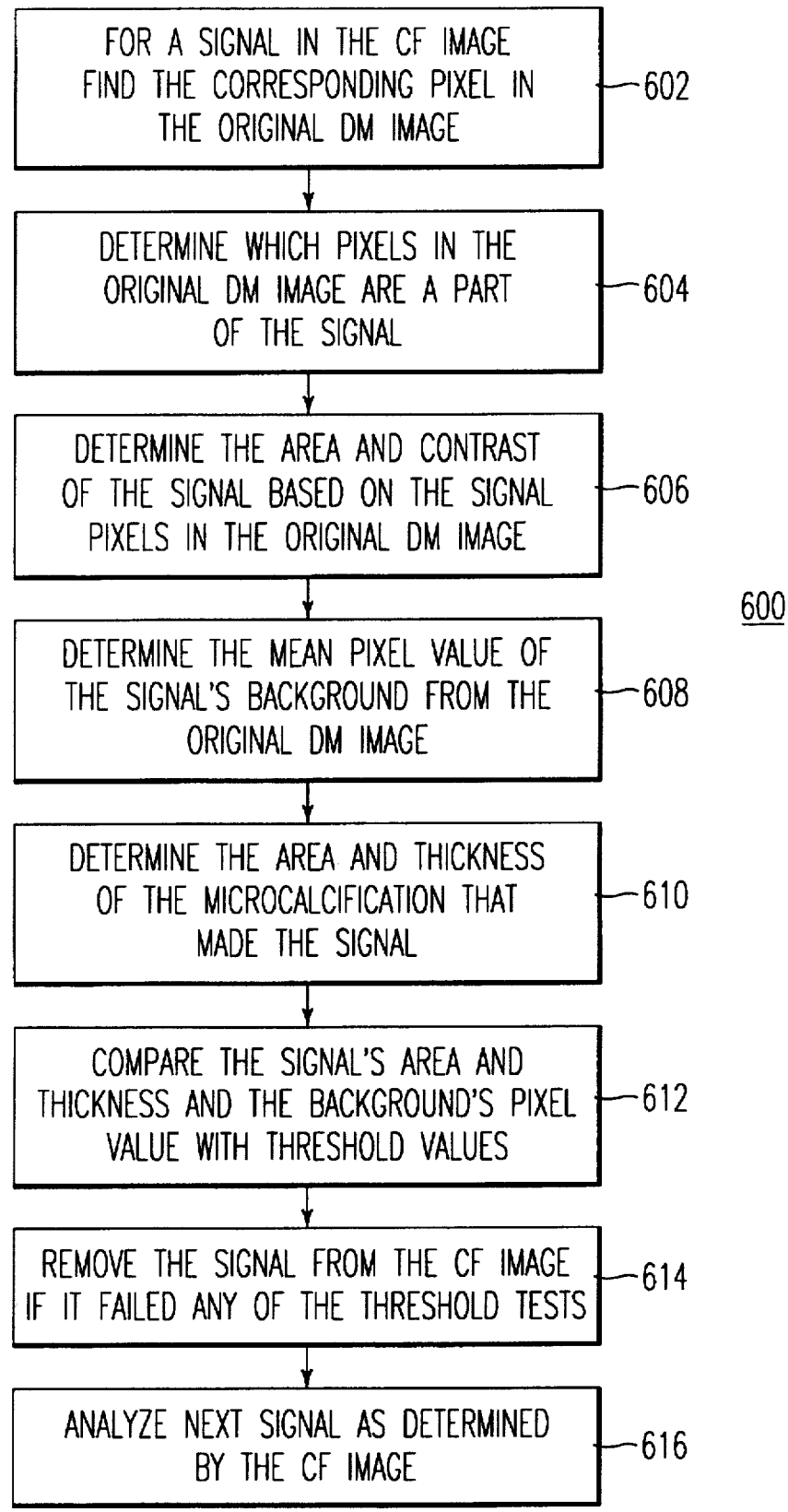
FIG. 13 is a flowchart illustrating schematically the steps performed in feature extraction and clustered microcalcification detection performed according to the present invention.

After the cluster filtering technique (step 500, FIG. 1) is performed, the process of the invention proceeds to step 600 involving feature extraction. From the original digitized image, key features of area, contrast (i.e., thickness) and background are extracted, using techniques as described hereinafter and as shown in FIGS. 12 and 13.

Signal contrast is one of the most important signal features used in detection by human observers. It is intuitively expected to be a useful feature also for the computerized analysis of images. However, as can be seen from FIG. 14, signal contrast in terms of exposure is amplified nonlinearly by the film gradient (the slope of the characteristic curve of the screen-film system) when expressed in terms of optical density. Signals or microcalcifications of the same size and shape (equal cross-sectional area and equal thickness) will have the same radiation contrast (i.e., contrast in terms of exposure), but can have different radiographic contrast (i.e., contrast in terms of optical density), depending on the background film density of the signal. Therefore, thresholding upon radiographic contrast will result both in a loss of signals with high radiation contrast in low-density regions and in a failure of discriminating against signals with low contrast in optimally exposed regions of the film. This problem can be solved by first converting the radiographic contrast of the signal to its radiation contrast and then applying a threshold to the radiation contrast of the signal. The inventors have developed a method for converting the pixel values of the signal and its background to its radiation contrast and subsequently deriving its effective thickness. The signal thickness was introduced to allow a direct comparison with signal area. These two quantities can be used as discriminating features against false signals detected by the present CAD scheme.

The relationship between the thickness of a microcalcification, t, and its radiation contrast, $R_c$, is given by $$R_c = (1-cF)(1+\exp(-\Delta\mu t)) \tag{5}$$

where c=scatter transmission factor of the anti-scatter x-ray grid,

F=the scatter fraction,

Δ=the difference in linear attenuation coefficients between calcification and glandular tissue.

The radiation contrast used in Eq. (5) must first be corrected for the blurring effects of the screen-film system using Eq. (6), which is based on the work by G. T. Barnes ("Radiographic mottle: A comprehensive theory"; *Medical Physics* Vol. 9, pp. 656–667, 1982):

$$R_c = R_c'(A_o/A)_{sf} \tag{6}$$

where $(A_o/A)_{sf}$ is the correction factor for the blurring effects of the screen-film system and $R_c'$ is the radiation contrast including the effects of blurring. The factor $(A_o/A)_{sf}$ depends on the size and shape of the signal and also on the modulation transfer function, MTF, of the screen-film system To calculate $R_c'$, one needs to know the ratio of the x-ray exposure of the signal to its background, $X_s/X_b$, that is, $$R_c' = (1 - X_s/X_b). \tag{7}$$

The x-ray exposure can be calculated using the characteristic curve of the screen-film system, H(D), which relates the film optical density, D, to the x-ray exposure, X, incident on the screen, $$X = H(D). \tag{8}$$

The film optical density can be determined from pixel value, P, using the calibration of the film digitizer, k, obtained from the characteristic curve of the film digitizer $$D = kP. \tag{9}$$

Before converting to D, the pixel values are first corrected for the blurring effect of the film digitizer using the relationship:

$$\Delta P = \Delta P'(A_o/A)_{dig}, \tag{10}$$

where $(A_o/A)_{dig}$ is the correction for the blurring effect of the film digitizer, ΔP' is the difference in pixel value between the signal $P_s'$, and its background, $P_b'$, including the degrading effects of blurring, ΔP is the difference in pixel value between the signal, $P_s$, and its background, $P_b$, after the correction. The factor $(A_o/A)_{dig}$ depends on the size and shape of the signal and also on the modulation transfer function, MTF, of the film digitizer. Note that it is assumed that $P_{b'} = P_b$, so that $$P_s = P_b + \Delta P = P_{b'} + \Delta P'. \tag{11}$$

Therefore, by determining the pixel value of the signal and its background, the thickness of the microcalcification that produced the signal pixel value can be determined.

Table 2 lists the parameters which were used. The characteristic curve and MFT data were experimentally determined. The calculations were performed assuming a 20-keV monoenergetic x-ray beam and a breast thickness of 4 cm.

TABLE 2

Parameters used in calculation of signal thickness from signal contrast

| | Attenuation parameters | | Scatter parameters | |
|---|---|---|---|---|
| | $\mu/\rho(cm^2/g)^{++}$ | $\rho(g/cm^3)^{++}$ | $c^{++}$ | $F^{++}$ |
| Microcalcification+ | 6.413 | 1.85 | 0.21 | 0.38 |
| Glandular tissue | 0.813 | 1.035 | | |

+Assumed to be $Ca_5(PO_4)_3OH$ with a density equal to that of cortical bone.
++μ/ρ and ρ are the mass attenuation coefficient and density of the microcalcification, respectively; c is the grid contamination factor, which equals the ratio of the transmitted scatter radiation to the incident radiation; and F is the scatter fraction, which equals the ratio of the scatter to the total radiation transmitted.

FIG. 13 provides a overview of the feature extraction technique (Step 600, FIG. 1) of the present invention. In the first step of the feature extraction technique, the binary image output by the cluster filtering technique is utilized to identify corresponding pixels in the original unprocessed image. In particular, in step 602, for each signal having a pixel value of "1023" in the clustered image produced in step 600, the corresponding pixel in the original unprocessed images is determined. In step 604, those pixels in the original image associated with the pixel determined in step 602 are determined, utilizing processing steps discussed hereinafter in relation to FIG. 14. Thereafter, in step 606, the area and contrast of the signal determined in step 604 are determined based on the signal pixels in the original image. In step 606, pixels in the original image that belonged to the signal under evaluation have been identified and the area of the signal is determined to be equaled to the number of pixels in the signal times the area of the pixel. Contrast of the signal is determined as described in FIG. 15.

In step 608 (FIG. 13) the mean pixel value of the background of the signal being evaluated is determined from the original image. The background pixel value is the mean pixel value in a 1×1-mm region excluding the newly identified signal pixels, minus the residual background offset. How the residual background offset is determined will be described later with reference to step 622 of FIG. 14.

In step 610, the area and the thickness of the microcalcification that made up the signal being evaluated is determined. Step 610 is discussed in more detail hereinafter in relation to FIG. 15.

After the area and thickness of the microcalcification corresponding to a signal having been processed in steps 602–610 is determined, as schematically shown in FIG. 3, step 612 is performed, in which the signals area and thickness and the background's pixel value are compared with threshold values. Step 612 corresponds to steps 700 and 800 shown in FIG. 1 and are included in FIG. 13 in order to clarify that the area vs. contrast test 700 and the contrast vs. background test 800 shown in FIG. 1 are performed for each signal determined in step 604. If any of the signals fails any of the threshold tests, then the pixel in the clustered image produced by the cluster filter technique 500, from which the signal is derived, is removed from the clustered image. This is shown schematically in step 614. As shown in FIG. 13, after a signal is removed from the clustered image due to failing any of the threshold tests, the next signal as determined by the clustered image is analyzed in step 616, until all candidate images as defined by the clustered image are analyzed, as represented in step 616 of FIG. 13.

As is evident from FIG. 13, any signal which fails any of the threshold tests has the pixel corresponding thereto in the clustered image removed from the clustered image, since such signals are determined to correspond to a false positive microcalcification detection. After analyzing all the signals, the locations of which are defined by the clustered image, a further cluster filtering is performed in step 900 (FIG. 1). The cluster filtering in step 900 basically repeats the cluster filtering steps 520–590 shown in FIG. 6 and further eliminates from the clustered image those locations which have been determined not to include problematic microcalcifications.

Figure 14:
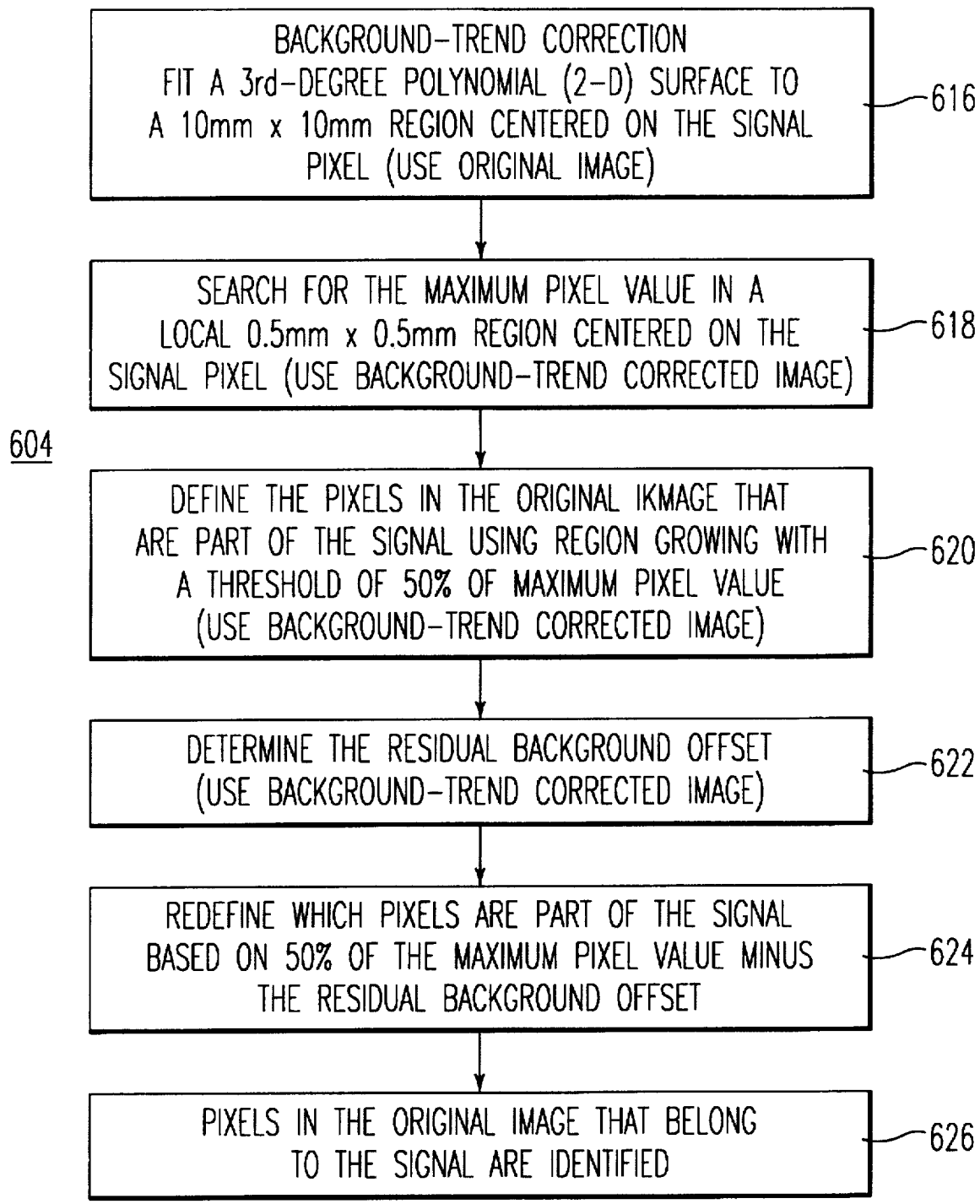
FIG. 14 is a flowchart illustrating schematically which pictures in an original image are determined to be part of a signal identified as being a candidate clustered microcalcifications.

FIG. 14 illustrates the steps performed to determine which pixels in the original image are part of a signal to be evaluated (step 604, FIG. 13).

To determine which pixels in the original image are a part of a signal to be considered as a signal to be evaluated, as shown in FIG. 14, in step 617 the signal pixel in the original image is identified based on the position of the signal in the cluster-filtered image, and in step 618 a background-trend correction is performed by fading a 3rd-degree polynomial(2–D) surface to a 10×10-mm region centered on the signal pixel in the original image. In step 619, the maximum pixel value is searched in a local 0.5×0.5-mm region centered on the signal pixel in the background-trend corrected image. Following step 619, in step 620 the pixels in the original image that are part of the signal are defined using a region growing technique employing a threshold of 50% of the maximum pixel value, using the background-trend corrected image. Thereafter, in step 622 the residual background offset is determined using the background-trend corrected image. The residual background offset is equal to the mean pixel value of all pixels within a 1×1-mm region centered on the signal in the background trend corrected image excluding those pixels identified as signal pixels. In step 624, which pixels are part of the signal are redefined based on a region growing with a threshold of 50% of the maximum pixel value minus the residual background offset. In step 626, the pixels in the original image that belong to the signal are identified as belonging to the signal and undergo the processing shown in step 606–616 of FIG. 13.

Figure 15:
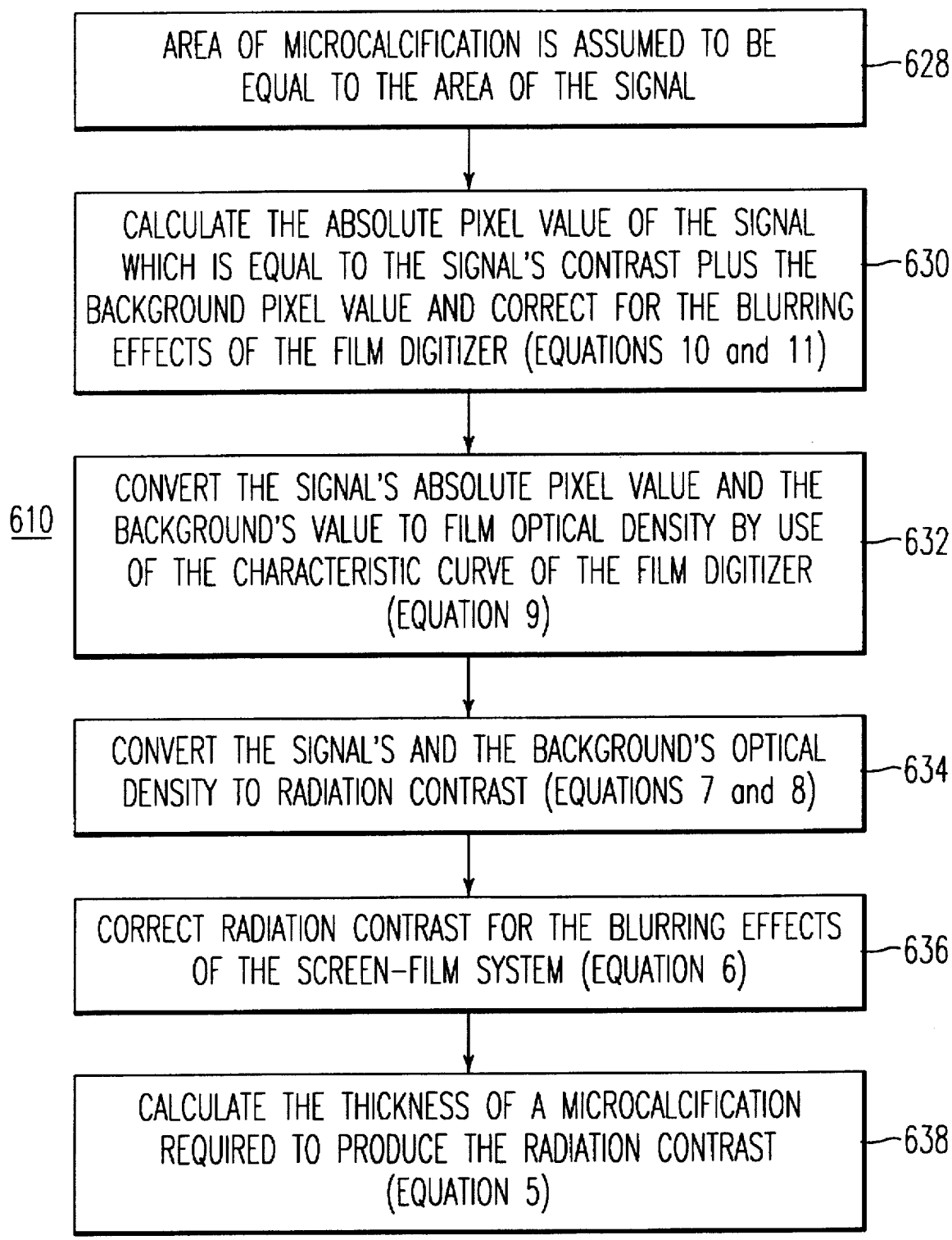
FIG. 15 is a flowchart illustrating schematically the steps by which features such as area, contrast, and background are extracted from background trend corrected image data for subsequent thresholding tests.

FIG. 15 illustrates the step of determining the area and thickness of the microcalcification of the signal formed in step 604. In step 628, the area of the microcalcification is said to be equal to the area of the signal, which is defined as the number of pixels comprising the signal. In the next step, 630, the absolute pixel value of the signal is calculated by adding the mean pixel value of those pixels identified as belonging to the signal in step 626 plus the background pixel value. Also a correction for the blurring effects of the film digitizer is made by use of Equations 10 and 11. In the next step, 632, the signals absolute pixel value, $P_s'$, in the backgrounds pixel value $P_b'$, are converted to the film optical density, D, by use of equation (9). Next, in step 634, the optical density of the signal and the background is converted to a radiation contrast, $R_c'$, by use of Eqs. (7–8). Thereafter, in step 636, the signal radiation contrast is corrected for the blurring effects of the screen film system by use of Eq. (6), and in step 638, the thickness of the microcalcification, t, required to produce the signal radiation contrast is calculated by use of Eq. (5). The calculated area, and thickness and background values are then utilized in step 700 and 800 for each signal, as next discussed in relation to FIGS. 16–18.

The previous scheme developed by the inventors (described in U.S. Pat. No. 4,907,156) has in common with the present scheme several techniques. Both schemes start with a digital mammogram and derive from it, a difference image. This difference image is then subjected to global and local thresholding techniques. Both schemes subject the thresholded image to an area discrimination technique and a clustering technique, but according to the present invention area filtering is performed prior to local thresholding. As described herein, the method used to accomplish area discrimination and clustering in the present scheme are improved over the previous scheme. In addition the present technique also uses a texture discrimination technique and feature extraction techniques based on the signal's area, contrast, and background pixel value.

With the prior CAD scheme, there were approximately 4.0 false clusters detected per image at a sensitivity of 85%. Approximately ⅔ of these belong to one of three categories. The first category is film artifacts on the mammogram, such as scratches or emulsion defects. The second category is low-intensity signal detected near the skin line. The third category is detected clusters that have no readily visible signal on the image. According to the present invention, a signal's area, contrast and background pixel value are used to eliminate some of these false-positive detections.

Figure 16:
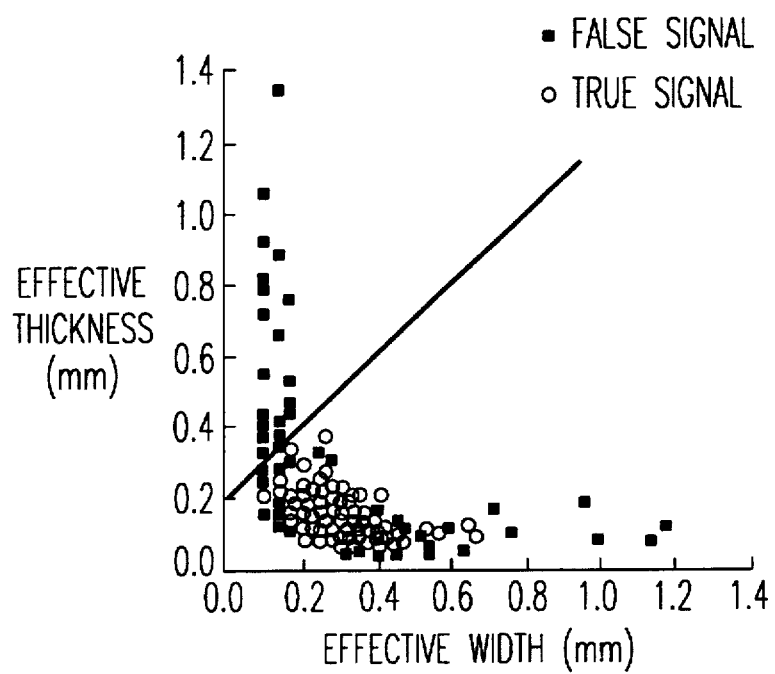
FIGS. 16, 17 and 18 are graphs illustrating thresholding performed on the basis of extracted features from the background-trend corrected image data.

FIG. 16 is a graph of a signals effective thickness (T) versus is effective width (W) for true and false signals. The diagonal line corresponds to the threshold of the T=W+0.2. As is evident from FIG. 16, there are many false signals that are small but have large effective thicknesses. These are caused by film artifacts that often appear as small, high contrast signals. The 45° diagonal line shown in FIG. 16 intersects the y-axis at 0.2 mm, and is used as a threshold for separating some false signals from true signals. Signals above the 45° diagonal line are considered to be false signals and are removed from the clustered binary image produced in step 500 (FIG. 1). This threshold can eliminate approximately 10% of false signals without eliminating any true ones.

Figure 17:
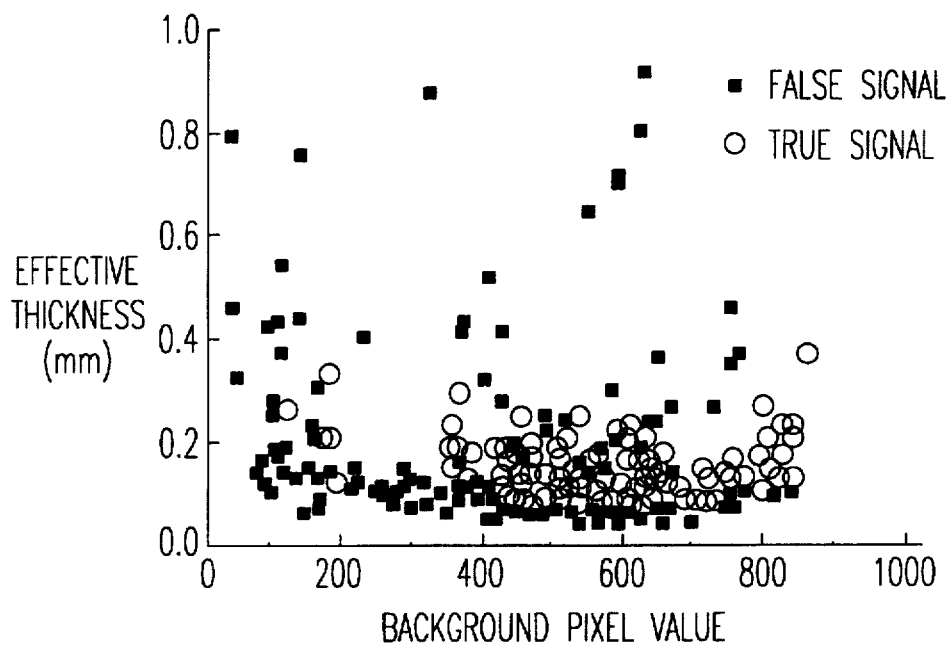

FIG. 17 is a graph of the signals effective thickness versus the background pixel value of the signal. A vertical line at background pixel value of 110 indicates the threshold value to be used according to the present invention. FIG. 7 shows that unlike true signals, false signals can appear in areas of the image with low background pixel value (dark areas of the image). Since microcalcifications are created by the glandular tissues of the breast, they often appear in bright areas of the image (high pixel values), because glandular tissue is more attenuating than adipose tissue. It is less likely that a true microcalcification would be found in very dark areas of the breast, because those areas correspond to very fatty areas of the breast. By setting a threshold of a pixel value of 110, approximately 8% of false signals can be eliminated without eliminating any true signals.

Figure 18:
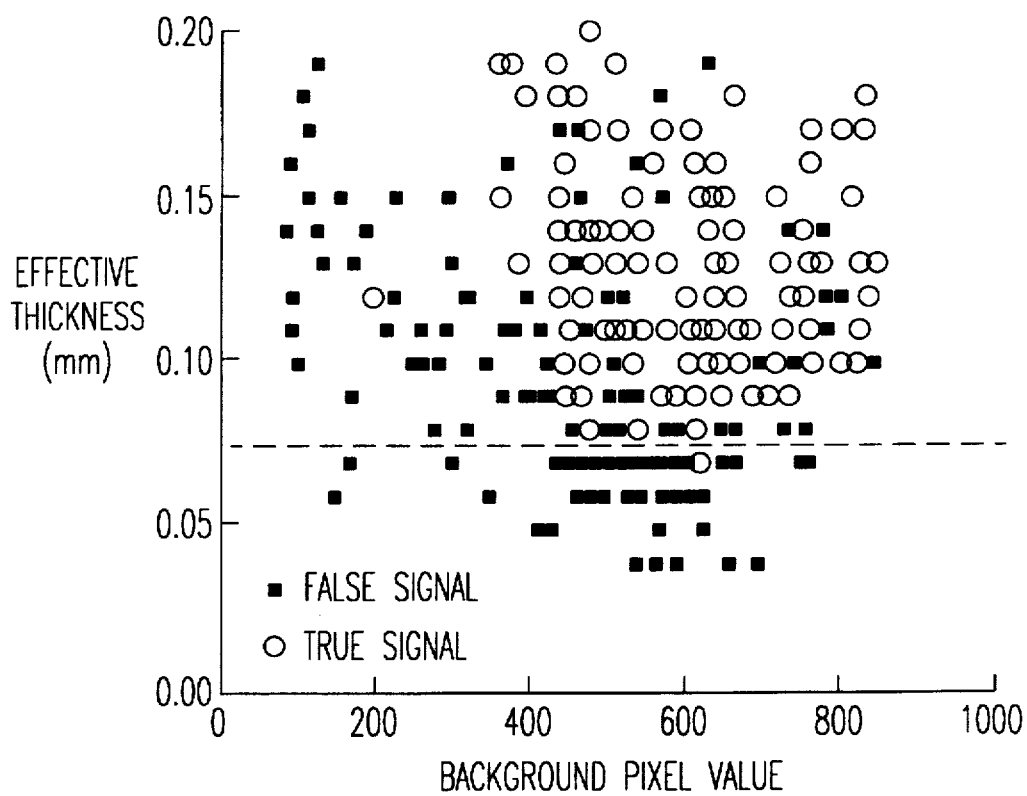

FIG. 18 is substantially the same as that shown in FIG. 17, except that the vertical axis has been expanded. A horizontal line at effective thickness of 0.075 mm indicates a threshold value to be employed in eliminating further false signals. FIG. 18 shows that there are many false signals with small effective thicknesses corresponding to very low contrast objects. By setting an effective thickness threshold from 0.05 mm, 20% of false signals can be eliminated with a loss of only 1 true signal.

The three different thresholds described in relation to FIGS. 16–18 enable the CAD technique of the present invention to differentiate true signals from false ones. The overall effect if using these three thresholds is to eliminate 37 of 100 false clusters, without a loss of any true clusters. As a result, the false-positive detection rate of the present CAD technique can be reduced to approximately 1.5 per image without a loss in sensitivity.

Obviously, numerous modifications and variations of the present invention are possible in light of the above teachings. It is therefore to be understood that within the scope of dependent claims, the invention may be practiced otherwise and as specifically described.

What is claimed as new and desired to be secured by letters patent of the United States is:

1. A method of computerized detection of clustered microcalcifications in a digital mammogram derived from an original radiographic image, comprising:

producing a multi-pixel difference image of said digital mammogram to remove low-frequency structured anatomic background;

performing a global gray-level thresholding of said difference image to produce a global thresholded image, including producing a histogram of the difference image, setting a global threshold based on a pre-selected percentage of pixels at the high end of the histogram, retaining unchanged in said difference image those pixels having a value above said global threshold, and setting to a predetermined constant the values of those pixels in the difference image which have a value below said global threshold;

performing area filtering by means of morphological erosion on the image data resulting after global thresholding thereby to produce an area filtered image in which small signals are selectively removed; and processing said area filtered image in which small signals are selectively removed to identify microcalcifications;

wherein said step of performing area filtering comprises:

defining plural structuring elements each having a size of at least two pixels, sequentially defining each pixel in the image after global thresholding as an operating pixel and sequentially overlaying each operating pixel with each structuring element;

determining, for each operating pixel sequentially overlaid by each structuring element, the minimum pixel value of the pixels overlaid by each structuring element in relation to the same operating pixel;

determining the maximum of the minimum pixel values determined in relation to the same operating pixel; and setting the value of each pixel in the output area-filtered image corresponding to the position of the operating pixel in the global thresholded image to the respective maximum of said minimum values determined in the preceding step.

2. The method according to claim 1, wherein said step of processing said area filtered image comprises:

performing local gray-level thresholding on the area filtered image to produce a threshold image in which pixels having a value below a local threshold are set to a uniform background value and pixels having values above the local threshold retain their values;

performing texture discrimination on the threshold image by removing background trend therefrom and setting to a predetermined value those pixels having a first moment of power spectrum greater than a predetermined value thereby to produce a texture discriminated image;

performing cluster filtering of the texture discriminated image to produce a cluster image of single-pixel signals identifying locations of potential microcalcifications;

extracting predetermined features from locations in the digital mammogram identified in said cluster filtering step; and identifying microcalcifications based on the features extracted in said extracting step.

3. The method according to claim 2, wherein said cluster filtering step comprises:

a step of area-point transformation in which signals representing possible microcalcifications are reduced to respective single pixels in a first binary image;

a step of counting the number of pixels exceeding a predetermined value in a kernel of a predetermined size scanned across said first binary image and copying the contents of the said first binary image that lay within the kernel to the corresponding locations in a second binary image whenever the contents of the kernel meet a predetermined grouping criteria based on said counting;

outputting a second binary image comprised of the pixels remaining after the counting and eliminating step.

4. The method according to claim 3, wherein said cluster filtering step comprising:

selecting the size of said kernel so as to discriminate against false clusters represented by pixels in the first binary image separated by greater than a predetermined distance.

5. The method according to claim 2, wherein said step of extracting predetermined features comprises:

determining, for each region in the digital mammogram of predetermined size corresponding to the location of each pixel of the second binary image, at least two of the area, contrast and background value of a signal within each said region.

6. The method according to claim 5, wherein said identifying step comprises:

performing an area versus contrast thresholding test to determine, for each signal for which features are extracted, whether that signal corresponds to a false positive signal, and if so, removing from said second binary image that pixel identifying the location of said false positive signal by setting the value of that pixel in the second binary image to a predetermined value.

7. This method according to claim 6, wherein said identifying step comprises:

performing a contrast versus background test to determine for each signal for which features are extracted, whether that signal corresponds to a false positive signal, and if so, removing from said second binary image that pixel identifying the location of said false positive signal by setting the value of that pixel in the second binary image to a predetermined value.

8. The method according to claim 7, wherein said identifying step further comprises:

a step of counting the number of pixels exceeding a predetermined value in a kernel of a predetermined size scanned across the binary image remaining after said area versus contrast thresholding test and said contrast versus background thresholding test, and copying the contents of the said binary image that lay within the kernel to the corresponding locations in a third binary image whenever the contents of the kernel meet a predetermined grouping criteria based on said counting; and indicating locations of microcalcifications in said original radiographic image based on the locations of pixels having a predetermined value in said third binary image.

9. The method according to claim 6, wherein said identifying step further comprises:

a step of counting the number of pixels exceeding a predetermined value in a kernel of a predetermined size scanned across the binary image remaining after said area versus contrast thresholding test, and copying the contents of the said binary image that lay within the kernel to the corresponding locations in a third binary image whenever the contents of the kernel meet a predetermined grouping criteria based on said counting; and indicating locations of microcalcifications in said original radiographic image based on the locations of pixels having a predetermined value in said third binary image.

10. This method according to claim 5, wherein said identifying step comprises:

performing a contrast versus background test to determine for each signal for which features are extracted, whether that signal corresponds to a false positive signal, and if so, removing from said second binary image that pixel identifying the location of said false positive signal by setting the value of that pixel in the second binary image to a predetermined value.

11. The method according to claim 10, wherein said identifying step further comprises;

a step of counting the number of pixels exceeding a predetermined value in a kernel of a predetermined size scanned across the binary image remaining after said contrast versus background thresholding test, and copying the contents of the said binary image that lay within the kernel to the corresponding locations in a third binary image whenever the contents of the kernel meet a predetermined grouping criteria based on said counting; and indicating locations of microcalcifications in said original radiographic image based on the locations of pixels having a predetermined value in said third binary image.

12. The method according to claim 2, wherein said step of performing local gray-level thresholding on the area filtered image comprises:

determining said local threshold at least in part based on a preselected multiple of the standard deviation of the pixel value in a region surrounding the respective pixels in said area filtered image.

13. The method of claim 1, wherein said step of defining plural structuring elements comprises:

defining said structuring elements to include at least one subset of all possible combinations of two interconnected pixels.

14. The method of claim 1, wherein said step of defining plural structuring elements comprises:

defining said structuring elements to include at least one subset of all possible combinations of three interconnected pixels.

15. A method of computerized detection of clustered microcalcifications in a digital mammogram derived from an original radiographic image, comprising:

filtering said digital mammogram to produce a filtered image from which signals meeting predetermined criteria are removed;

performing a first cluster filtering on said filtered image to produce a cluster image of single-pixel signals identifying locations of prospective problematic microcalcifications;

extracting predetermined features from signals at locations in the digital mammogram identified by the single-pixel signals in said cluster image;

performing at least one predetermined thresholding test based on the extracted features and based on said predetermined thresholding test, determining whether the signals from which the features were extracted correspond to a false-positive microcalcification cluster;

eliminating from said cluster image those single-pixel signals corresponding to locations of false-positive microcalcification clusters;

performing a second cluster filtering on the cluster image remaining after said eliminating step and outputting a further cluster image comprised of single-pixel values; and indicating in said original radiographic image locations of clustered microcalcifications based on the locations of pixels having a predetermined value in said further cluster image.

16. The method according to claim 15, wherein said filtering step comprises:

producing a multi-pixel difference image of said digital mammogram to remove low-frequency structured anatomic background;

performing a global grey-level thresholding of said difference image, including producing a histogram of the difference image, setting a global threshold based on a pre-selected percentage of pixels at the high end of the histogram, retaining unchanged in said difference image those pixels having a value above said global threshold, and setting to a predetermined constant the values of those pixels in the difference image which have a value below said global threshold;

performing area filtering by means of morphological erosion on the image data resulting after global thresholding thereby to produce an area filtered image in which small signals are selectively removed;

performing local grey-level thresholding on the area filtered image to produce a threshold image in which pixels having a value below a local threshold determined at least in part based on a pre-selected multiple of the standard deviation of the pixel value in a region surrounding the respective pixels in said area filtered image are set to a uniform background value and pixels having values above the local threshold retain their values; and performing texture discrimination on the threshold image by removing background trend therefrom and setting to a predetermined value those pixels having a first moment of power spectrum greater than a predetermined value thereby to produce a texture discriminated image.

17. The method according to claim 16, wherein said step of area filtering comprises:

defining plural structuring elements each having a size of at least two pixels;

sequentially defining each pixel in the image after global thresholding as an operating pixel and sequentially overlaying each operating pixel with each structuring element;

determining, for each operating pixel sequentially overlaid by each structuring element, the minimum pixel value of the pixels overlaid by each structuring element in relation to the same operating pixel;

determining the maximum of the minimum pixel values determined in relation to the same operating pixel; and setting the value of each pixel in the output area-filtered image corresponding to the position of the operating pixel in the global thresholded image to the respective maximum of said minimum values determined in the preceding step.

18. The method of claim 17, wherein sad step of defining plural structuring elements comprises:

defining said structuring elements to include at least one subset of all possible combinations of two interconnected pixels.

19. The method of claim 17, wherein said step of defining plural structuring elements comprises:

defining said structuring elements to include at least one subset of all possible combinations of two interconnected pixels.

20. The method according to claim 15, wherein said first cluster filtering step comprises:

a step of area-point transformation in which signals representing possible microcalcifications are reduced to respective single pixels in a first binary image;

a step of counting the number of pixels exceeding a predetermined value in a kernel of predetermined size scanned across said first binary image and copying the contents of the said binary image that lay within the kernel to the corresponding locations in a second binary image whenever the contents of the kernel meet a predetermined grouping criteria based on said counting; and outputting said second binary image comprised of the pixels remaining after the counting and copying step.

21. The method according to claim 20, wherein said second cluster filtering step comprises:

a step of counting the number of pixels exceeding a predetermined value in a kernel of predetermined size scanned across the cluster image remaining after said eliminating step, and copying the contents of said cluster image that lay within the kernel to the corresponding locations in a third binary image whenever the contents of the kernel meet a predetermined grouping criteria based on said counting.

22. The method according to claim 20, wherein said step of extracting predetermined features comprises:

determining, for each region in said digital mammogram of predetermined size corresponding to the location of each pixel in said cluster image, at least two of area, contrast and background values of a signal within each said region.

23. The method according to claim 22, wherein said step of performing at least one predetermined thresholding test comprises:

performing an area versus contrast thresholding test to determine, for each signal for which features are extracted, whether that signal corresponds to a false positive microcalcification cluster, and if so, removing from said cluster image that pixel identifying the location of said false positive microcalcification cluster by setting the value of that pixel in the cluster image to a predetermined value.

24. This method according to claim 23, wherein said of performing at least one predetermined thresholding test identifying comprises:

performing a contrast versus background test to determine for each signal for which features are extracted, whether that signal corresponds to a false positive signal, and if so, removing from said cluster image that pixel identifying the location of said false positive signal by setting the value of that pixel in the cluster image to a predetermined value.

25. This method according to claim 22, wherein said step of performing at least one predetermined thresholding test comprises:

performing a contrast versus background test to determine for each signal for which features are extracted, whether that signal corresponds to a false positive signal, and if so, removing from said cluster image that pixel identifying the location of said false positive signal by setting the value of that pixel in the cluster image to a predetermined value.

26. The method according to claim 20, wherein said first cluster filtering step comprises:

selecting the size of said kernel so as to discriminate against false clusters represented by pixels in the first binary image separated by greater than a predetermined distance.

* * * * *